United States Patent
Huitema

(10) Patent No.: US 8,508,468 B2
(45) Date of Patent: Aug. 13, 2013

(54) DISPLAY APPARATUS COMPRISING ELECTROFLUIDIC CELLS DRIVEN BASED ON CALCULATED CHARGE CORRESPONDING TO CURRENT AND NEW PIXEL CELL DISPLAY PROPERTIES

(75) Inventor: Hjalmar Edzer Ayco Huitema, Veldhoven (NL)

(73) Assignee: Creator Technology B.V., Breda (NL)

( * ) Notice: Subject to any disclaimer, the term of this patent is extended or adjusted under 35 U.S.C. 154(b) by 465 days.

(21) Appl. No.: 12/790,537

(22) Filed: May 28, 2010

(65) Prior Publication Data

US 2011/0007056 A1 Jan. 13, 2011

Related U.S. Application Data

(60) Provisional application No. 61/182,487, filed on May 29, 2009.

(51) Int. Cl.
*G09G 3/34* (2006.01)
*G02B 26/00* (2006.01)

(52) U.S. Cl.
USPC .......................................... 345/107; 359/296

(58) Field of Classification Search
USPC .......... 345/107, 204–215, 690–698; 359/296
See application file for complete search history.

(56) References Cited

U.S. PATENT DOCUMENTS

| | | | | |
|---|---|---|---|---|
| 6,404,413 B1 * | 6/2002 | Harris et al. | ..................... | 345/85 |
| 2002/0005832 A1 * | 1/2002 | Katase | ........................... | 345/107 |
| 2006/0132927 A1 * | 6/2006 | Yoon | ............................. | 359/665 |
| 2007/0075922 A1 * | 4/2007 | Jessop | ............................ | 345/49 |
| 2008/0273007 A1 * | 11/2008 | Ng et al. | ........................ | 345/107 |
| 2008/0278434 A1 * | 11/2008 | Van Dijk et al. | .............. | 345/107 |

FOREIGN PATENT DOCUMENTS

WO WO 2009004042 A1 * 1/2009
WO WO 2009036272 A1 * 3/2009

* cited by examiner

*Primary Examiner* — Chanh Nguyen
*Assistant Examiner* — Navin Lingaraju

(57) ABSTRACT

A display apparatus is disclosed comprising a plurality of electrofluidic chromatophore (EFC) pixel cells, each pixel cell comprising a fluid holder for holding a polar fluid and a non-polar fluid having differing display properties. The fluid holder comprises a fluid reservoir and a channel. The channel is connected to the reservoir so as to enable movement of the polar fluid and non-polar fluid between the channel and the reservoir. A supply voltage applied to the channel results in a movement of the polar fluid to change a cell display property. A circuit board supplies an electrical charge to the pixel cells to generate the supply voltage. A display controller comprises a state lookup table storing, for a respective pixel cell, the current pixel cell display property. The display controller calculates the electrical charge as a function of the current pixel cell display property and the new pixel cell display property.

16 Claims, 17 Drawing Sheets

$$(\Delta Tr/\Delta \mathrm{Re})_x \sim \Delta A_x \approx \Delta C_x \approx C_{x2} - C_{x1} = C_{x1}\left(\frac{V_{x1}}{V_{x2}} - 1\right) \Rightarrow V_{x1} = \frac{C_{x2}}{C_{x1}} V_{x2}$$

$$C_{(j+1)1} \approx C_{j2}$$

Figure 1
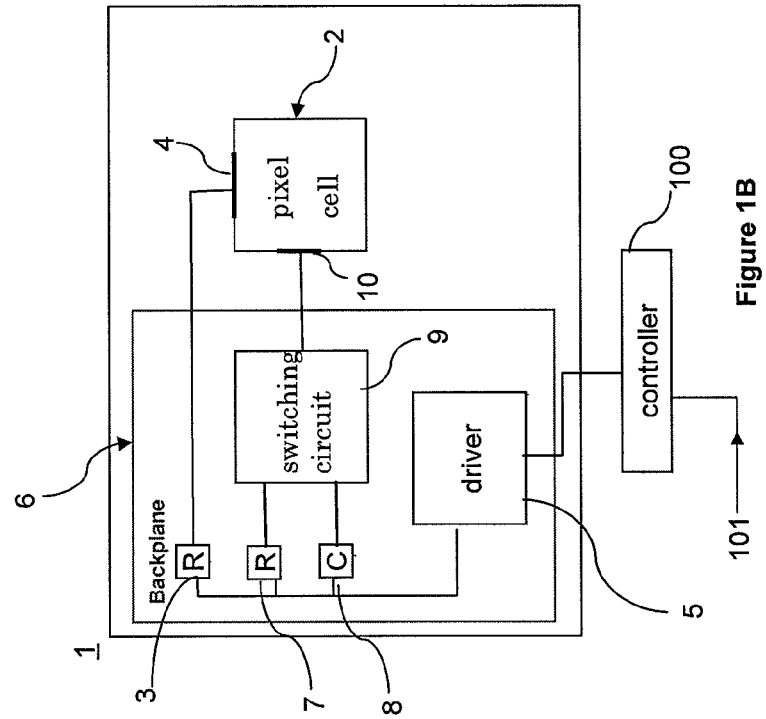
Figure 1B
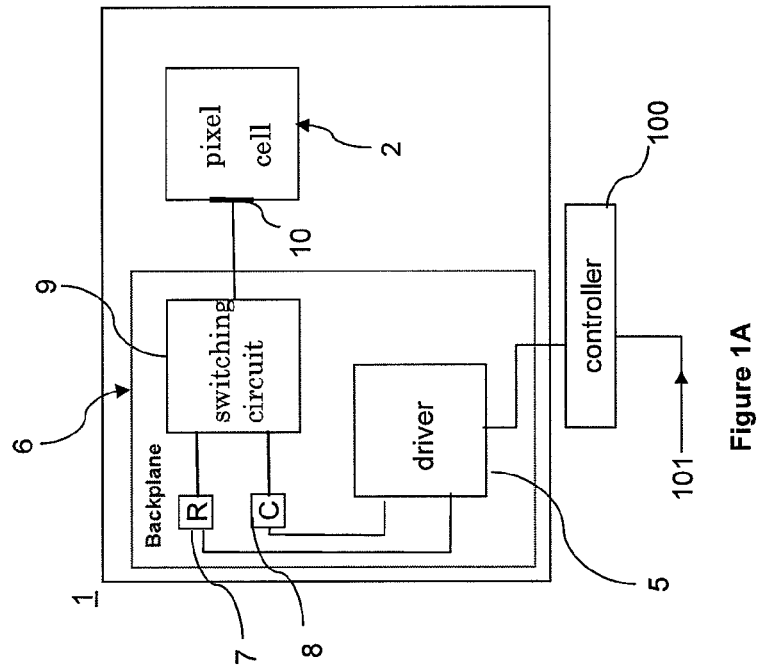
Figure 1A

Figure 2:
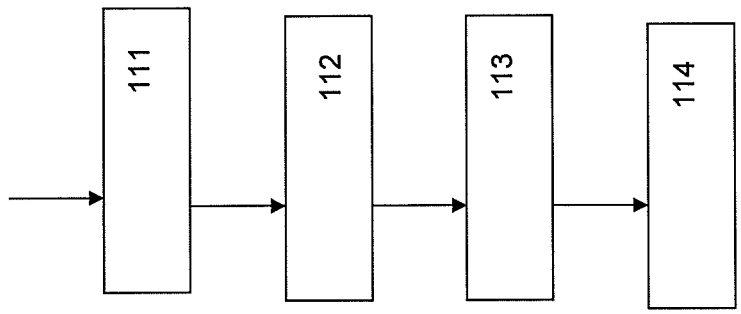
Figure 2B
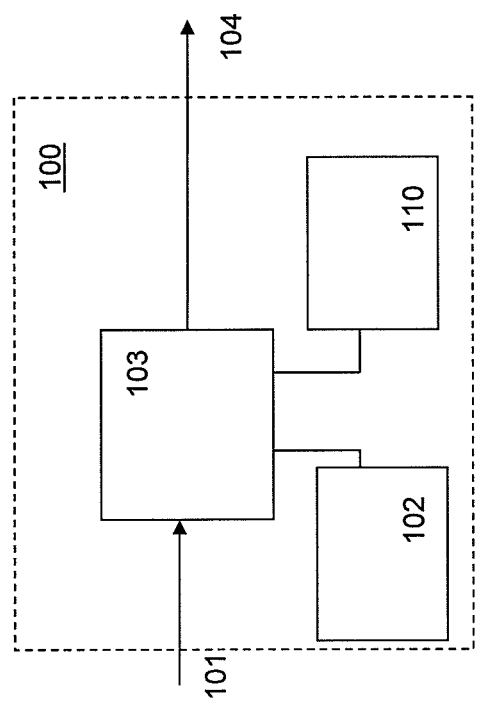
Figure 2A

Figure 6
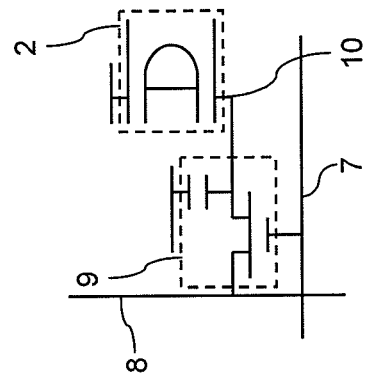
Figure 6A:
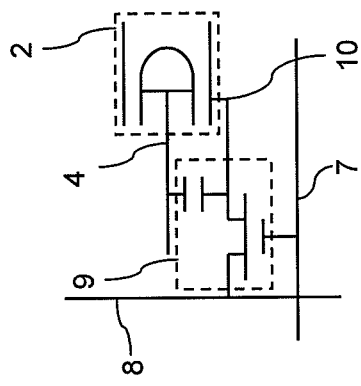
Figure 6B:
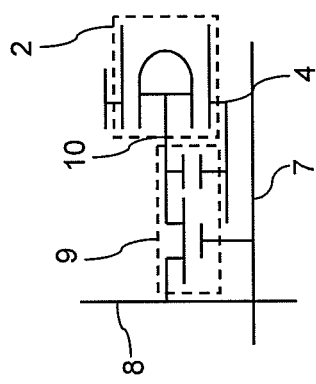
Figure 6C:
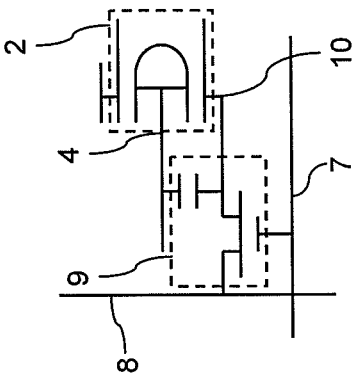
Figure 6D:

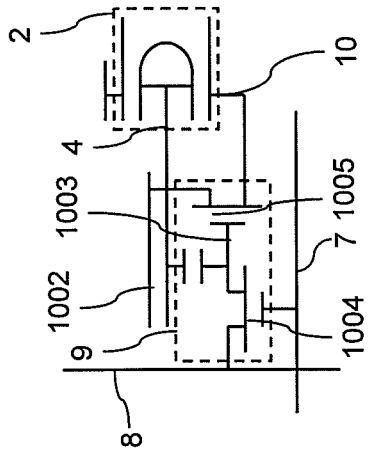
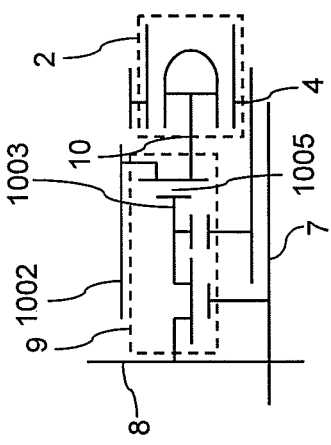
Figure 11
Figure 11A
Figure 11B
Figure 11C
Figure 11D

DISPLAY APPARATUS COMPRISING ELECTROFLUIDIC CELLS DRIVEN BASED ON CALCULATED CHARGE CORRESPONDING TO CURRENT AND NEW PIXEL CELL DISPLAY PROPERTIES

CROSS-REFERENCE TO RELATED APPLICATION

This application claims priority of Huitema, U.S. Provisional Application Ser. No. 61/182,487, filed on May 29, 2009, entitled "DISPLAY APPARATUS COMPRISING ELECTROFLUIDIC CELLS," the contents of which are expressly incorporated herein by reference in their entirety including the contents and teachings of any references contained therein.

TECHNICAL FIELD

The invention relates to the field of displays, in particular, displays comprising electrofluidic cells.

BACKGROUND OF THE INVENTION

Up to now, in certain areas of display technology, in particular, flexible displays, an electrophoretic electro-optical medium is commonly used. However, the electrophoretic electro-optical medium is subject to a number of restrictions. The medium has a relatively slow pixel response that makes video display challenging and has a relatively low brightness compared to paper.

Displays based on the electrowetting electro-optical medium may remedy at least some of the restrictions mentioned above. A particular variant using this principle is e.g. described in publication WO2004068208. A disadvantage of this variant is that the electro-optical medium has a height dimension that is relatively large compared to liquid crystal or electrophoretic displays. This is especially disadvantageous for the use in flexible displays.

Driving electrofluidic cell displays is different from any other known display as the cell capacitance strongly varies while charging the electro fluidic display in a way that cannot simply be compensated for by a large storage capacitor as is usually done for LC displays. This requires novel ways to address the pixels that are presented here.

SUMMARY OF THE INVENTION

It is an object of the present invention to provide an improved, electrowetting based display in regard of the above aspects.

According to an aspect, there is provided a display apparatus, the apparatus comprising a plurality of electrofluidic chromatophore (EFC) pixel cells, each pixel cell comprising a fluid holder for holding a polar fluid and a non-polar fluid having differing display properties, the fluid holder comprising a fluid reservoir with a geometry having a small visible area projected in the direction of the viewer, and a channel with a geometry having a large visible area projected in the direction of the viewer, the channel being connected to the reservoir so as to enable movement of the polar fluid and non-polar fluid between the channel and the reservoir, at least part of a surface of the channel and the reservoir comprising a wetting property responsive to a supply voltage, at least two pixel cell terminals being arranged to provide the supply voltage to the at least part of the surface of the channel and the reservoir comprising the wetting property; the supply voltage resulting in a movement of the polar fluid to change a cell display property or in the absence of movement of the polar fluid being a stable voltage; a circuit board comprising a plurality of switching circuits for supplying an electrical charge to the pixel cells, the switching circuit being connected to one of the at least two pixel cell terminals, so as to generate the supply voltage, a plurality of row and column electrodes, the row and column electrodes being pair-wise coupled to the switching circuit; and a driver being configured to charge the row and column electrodes and activate the switching circuits. A display controller is arranged to control the driver as a result of pixel image information inputted in the display controller; the display controller comprising a state lookup table storing, for a respective pixel cell, the current pixel cell display property, the display controller further arranged to calculate the electrical charge as a function of the current pixel cell display property; and wherein controller controls the driver to supply the calculated electrical charge required to generate the new pixel cell display property.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 1: is a schematic representation of a display apparatus according to an embodiment of the present invention;

FIG. 2: shows in more detail a display controller comprising a state lookup table;

FIG. 6: is a set of schematic views depicting (four) illustrative examples of voltage addressing circuits;

FIG. 11: is a set of schematic views depicting (four) illustrative examples of voltage rail addressing circuits;

DETAILED DESCRIPTION OF THE DRAWINGS

Figure 3B:
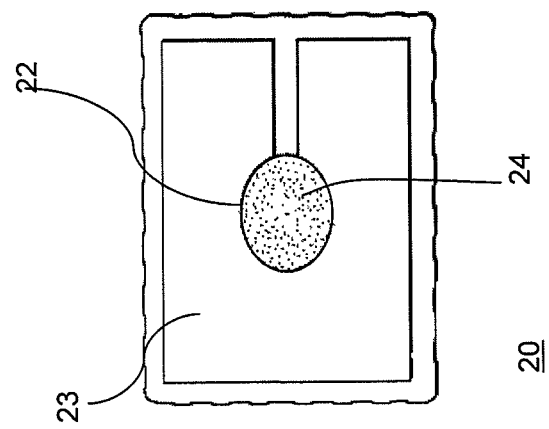
FIG. 3: is a schematic representation of the electrophoretic pixel cell.

Turning to FIG. 1, FIG. 1a shows an example of a display apparatus 1. In addition to a plurality of pixel cells 2, the display apparatus as shown in FIG. 1 further comprises a circuit board 6 in the art also referenced as backplane. The board may be bendable with a small radius for example smaller than 2 cm—so that the display can be rolled, flexed or wrapped in a suitably arranged housing structure. The circuit board 6 comprises a plurality of switching circuits 9 for supplying an electrical charge to the pixel cells 2, where each switching circuit is connected to one pixel cell and vice versa. The switching circuit is connected to at least one of the pixel cell terminals 10. As further described below, typically the switching circuit 9 comprises an active element, typically including a thin film (field effect) transistor. It is noted that the term switching circuit is a neutral term in the sense that it does not imply the character of the active element nor does it imply the drive schemes used to control the pixelized electrofluidic cells 2. The combination of a switched circuit and a connected pixel cell is defined as a pixel of the display apparatus 1.

The circuit board further comprises a plurality of row and column electrodes 7, 8. The row and column electrodes 7, 8 are pair-wise coupled to the switching circuits 9.

The circuit board further comprises a driver 5 being configured to charge the row and column electrodes 7, 8 and activate the switching circuits 9 to address the electrical charge to the pixel cells 2 via switched terminal 10. A display controller 100 is arranged to control the driver 5 as a result of pixel image information 101 inputted in the display controller 100.

FIG. 1b shows another example of the display apparatus 1 according to the present invention. The apparatus comprises a circuit board 6 and a plurality of pixel cells 2. Typically, the pixel cell 2 comprises at least one further pixel cell terminal 4 that is coupled to a further electrode 3 to supply a direct voltage to the pixel cell. The driver is configured to additionally charge the further electrode 3, to define a pixel cell intermediate condition. This condition will be explained further below with reference to the working principle of the electrofluidic pixel cell 2. The switching circuit typically has row and column electrodes 7, 8 respectively that connect the switching circuit to the driver, although it is also possible that more or less electrodes are used depending on the specific implementation of the switching circuit.

FIG. 2 shows in more detail the display controller 100 comprising a state lookup table 102 storing, for a respective pixel cell 2, the current pixel cell display property. Referring to the detailed explanation of FIG. 3, as a specific embodiment, the cell display property is expressed as the transmission and/or reflection of the pixel cell at a predefined wavelength or in a range of predefined wavelengths; corresponding to a certain visible area of the channel 23 filled with the polar fluid 24. The display controller 100 is arranged to calculate an electrical charge required to change the current pixel cell display property stored in the lookup table 102 to the new pixel cell display property and issues control signals 104 to control the driver 5 to supply the calculated electrical charge to the pixel cell. Due to the capacitive character of the cell (see below FIG. 5), supply of electric charge results in varying the wetting property of a pixel surface—resulting in a varying display property. By using the lookup, only limited amounts of charge need to be addressed to the pixel cell 2 since the fluid front, being the interface between the polar and the non-polar fluid in the channel, can be controlled from the current position without reset, thereby reducing the power consumption of the display and the voltages required to drive the display. Also, the use of a reset between every change of the display property may result in undesirable visual artifacts, such as flicker or a reduced contrast of the display. The Controller 100 comprises processing circuitry 103 programmed to execute the steps of: receiving (111) a desired pixel state for a selected number of pixels; for each of the selected number of pixels identifying (112), in the lookup table 102, the current pixel state; calculating (113) an electrical charge to be supplied to the pixel to change the pixel display property from the present state to the desired state; and addressing (114) control signals to the driver to address the calculated charge to the pixel cell 2. In practical embodiments, the current pixel state and new pixel state may be stored in a frame buffer functioning as lookup table 102.

In preferred embodiments the calculation step 113 involves calculating the electrical charge by using a further lookup table 110 storing, for any pixel state of the pixel cell, the amount of charge capacitively stored in the pixel cell; and deriving the electrical charge as a difference of the charge amounts corresponding to the present and desired pixel states. This further lookup table may be used for storing the information needed to drive a pixel from the current to the desired (new) cell display property. In practical terms this can for example be a matrix with the current and the desired switching states as entries and the required column voltage to switch from the current to the desired switching state as value. For a display with 256 different switching states per pixel the matrix has 256×256 elements. It is also possible that the values are more complex, such as the number of frames a certain column voltage must be addressed to the pixel or even a more complex driving sequence.

Although the calculation step can be efficiently executed by such a further lookup table 110, other calculation routines, such as involving a linear table or evaluating a functional relationship may be used.

Figure 3A:
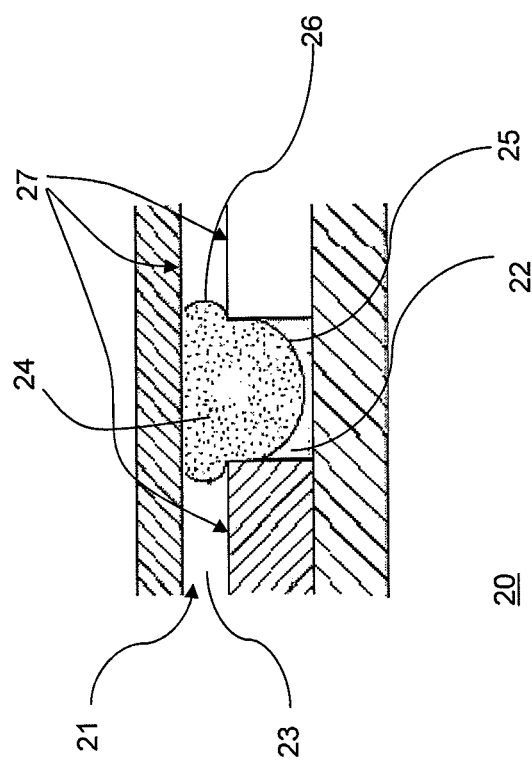

FIG. 3: Schematic Representation of the Electrophoretic Pixel Cell According to the Present Invention.

FIG. 3 shows an embodiment of a pixel cell 20 in more detail. A pixel cell comprises a fluid holder 21. The fluid holder comprises a fluid reservoir 22 with a small visible area and comprises a channel 23 with a large visible area. The reservoir 22 and the channel 23 are connected so as to enable free movement of the polar fluid 24 and non-polar fluid between the channel and the reservoir.

Typically, besides a polar fluid 24, the fluid holder 21 also comprises a non-polar fluid (not shown). To generate a cell display property, e.g. a certain transmissive or reflective optical state of the pixel cell 20, the polar fluid 24 and the non-polar fluid have differing display properties. In an embodiment, the polar fluid has an optical properties differing from the non-polar fluid. Typically, the polar fluid 24 comprises water and the non-polar fluid comprises oil. Preferably the water is blackened and the oil is left clear or diffusely scattering, because blackening water with pigments may yield a more saturated black than blackening oil with dyes. Pigmented blackened water may result in a sufficiently black pixel color with a layer of water with a thickness of only 3 micrometer. This allows a display with a total thickness less than 100 micrometer, which typically is within a suitable thickness range for flexible displays. Typically the water contains ionic content as the conductive element. The non-polar fluid may occupy the space not occupied by the polar fluid. The non-polar fluid is preferably immiscible with the polar fluid. In an embodiment, the geometry of the channel 23 and the reservoir 22 are carefully constructed to impart a mutually differing principle radius of curvature. In such embodiments, the fluid reservoir 22 imparts a large principle radius 25 of curvature onto the polar fluid and the channel imparts a small principle radius 26 of curvature onto the polar fluid when the channel and the reservoir surfaces are sufficiently hydrophobic. This configuration results in a Young-Laplace force that aims to bring the polar fluid in its energetically most favorable shape, i.e. the droplet shape and urges the polar fluid into the reservoir 22.

On the other hand, however, the polar fluid 24 can be urged into the channel by generating an electromechanical force opposite to the Young-Laplace force. To control this force, at least part of a surface 27 of the channel and reservoir comprises a wetting property responsive to an applied supply voltage to the channel wall. The polar fluid 24 may comprise a conductive element or component. Typically a hydrophobic fluoropolymer is provided on at least part of the channel surface, although other materials having a wetting property responsive to an electric field may be applied.

The electromechanical force is directed opposite to the counteracting force that urges the polar fluid into the reservoir and can be controlled by varying the supply voltage. This counteracting force may be the Young-Laplace force or another, oppositely directed, electromechanical force or a combination of those. In the absence of movement of the polar fluid the supplied voltage is called stable voltage which provides a balance of counteracting force and electromechanical force.

By applying a supply voltage to the channel surface, the induced electric field typically reduces the hydrophobic character of the fluoropolymer and results in an electromechanical force aiming to bring the polar fluid 24 from the reservoir 22 into the channel 23 that is proportional to the square of the supply voltage over the at least part of the channel surface 27.

The supply voltage changes the wetting property of at least part of the surface 27 of the channel 23.

Any part of the channel that is not supplied by a voltage, i.e. electrowetted, may preferably have a small Young's angle that is close to 90 degrees in order to reduce the net Young-Laplace force that has to be overcome by the channel surface that is supplied by a voltage.

Varying the electromechanical force may be used to control the movement of the polar fluid 24 in the pixel cell 20. Therefore, the pixel cell 20 comprises at least two pixel cell terminals. The pixel cell terminals are arranged to apply a supply voltage to the at least part of the surface of the channel 23 comprising the wetting property responsive to an applied supply voltage. The polar fluid 24 and non-polar fluid may have mutually differing display properties in order to provide a cell display property, being a pixel cell color or pixel color, also encompassing monochromatic variants.

In FIG. 3B, it can be seen that the geometry of the fluid reservoir 22 imparts a small visible area projected in the direction of the viewer 24 and the geometry of the channel 23 imparts a large visible area projected in the direction of the viewer 24. To create a black state, the blackened water occupies the channel 23 and the clear oil occupies the reservoir 22. In the white state, the clear oil occupies the channel 23 and the blackened water the reservoir 22. By varying the amount of black water and clear oil in the channel 23, various cell display properties, e.g. color states, may be created.

It is noted that the reservoir 22 may be hidden by a 'black mask' to obtain a more saturated black color. Alternatively the part of the channel 23 intersecting with the top of the reservoir 22 may always be occupied by the polar fluid 24 to create a more saturated black state. In practice however, due to the small visible area compared to the lateral dimensions of the pixel cell, the visibility of the reservoir 22 is hardly a problem.

Color Transitions: To-Black and To-White

When in use, the pixels may frequently change from one color to another color. When the new color is darker than the present color, i.e. has a higher black component, the new color may be obtained by moving black water into the channel 23. This is called a to-black transition. When the new color is lighter than the present color, i.e. has a lower black component, the new color may be obtained by moving black water into the reservoir 22. This is called a to-white transition. The movement of the black water may be controlled by varying the supply voltage over the channel surface 27, thereby changing the wetting property of the surface 27. Referring to FIG. 1A, the driver 5 may be configured to supply a direct voltage to the pixel cell that is dependent on the cell display property change.

A color display variant may be implemented by using water of different colors for different pixel cells, for example red, green and blue or cyan, magenta and yellow, or by providing a color filter on top of a black and white display or by integrating the color filter in the display on or near any part of the channel surface 27.

Figure 4:
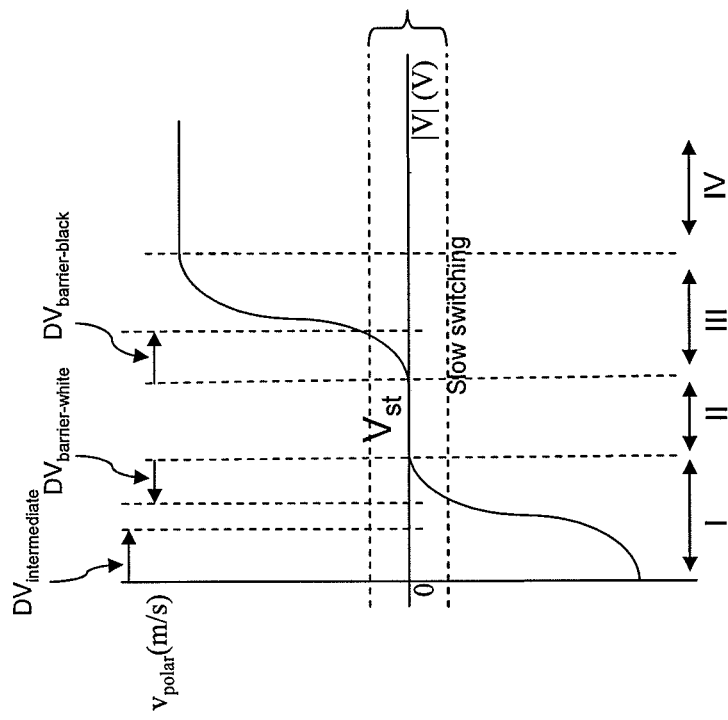
FIG. 4: is a graph depicting the relationship between fluid front velocity and supply voltage.

FIG. 4: Graph of Fluid Front Velocity Depending on Supply Voltage.

FIG. 4 shows a schematic representation of the speed of the water vpolar, i.e. of the front of the polar fluid 24, also referred to as the water front, as a function of the supply voltage V over the channel surface 27. Thus, FIG. 4 illustrates the supply voltage regimes resulting in a movement of the polar fluid 24 and a change of the cell display property.

The x-axis represents the supply voltage over the channel surface; the y-axis represents the speed of the water front. Since the electromechanical force Fem is proportional to the voltage squared $V^2$, the graph is symmetrical around the y-axis, i.e. the system gives a substantially symmetrical response around 0V. Therefore the absolute value of the voltage is shown on the horizontal axis.

In this graph, a positive speed means that the water moves into the channel 23 and a negative speed means the water retracts out of the channel into the reservoir 22. The area in the graph denoted by 'Slow switching' indicates the area where the switching speed may be too low to allow a high update rate of the display, for example to allow video rate.

The graph may be roughly divided in four parts. In part I, from x=0, the speed starts at a negative value and steeply increases towards zero, the graph then reaches the x-axis. In part I, the counteracting force is larger than the electromechanical force so that the water retracts into reservoir.

In part II, the so-called stable region, the counteracting force is substantially equal to the electromechanical force and the speed equals zero so that the water front is stable at position. The supply voltage equals a stable voltage Vst ranging in stable voltage region II. The width of the region part II on the x-axis is non-zero due to the effects of wetting hysteresis or a wetting barrier that is inherent to the materials used in the pixel cell 20, or that is purposely added to the pixel cell 20 to create a well-defined width for the region part II. The possible effect of barriers on the stable region is indicated by the arrows labeled 'DVbarrier-white' and 'DVbarrier-black', indicating the effect of a barrier for the water front when retracting into the reservoir and when advancing into the channel, respectively. The effect of these barriers is to increase the width of the stable region to lower voltages and to higher voltages, respectively. These barriers may be provided by physical structures locally influencing an applied electric field to the channel surface having a wetting property, by physical structures locally influencing the wetting property or by physical structures locally influencing the radius of curvature and thus the Young-Laplace pressure of the polar liquid in the channel. These barriers may also include a change in the chemical composition at the surface which has strong influence on the wetting properties.

Subsequently, in part III, the electromechanical force becomes larger than the counteracting force; the speed of the water front is positive, which means that the water moves into the channel. In this part, the graph steeply rises until a plateau is reached. The plateau is part IV wherein, although the voltage still increases and therewith the electromechanical force, the speed saturates and levels off to a substantially constant value due to fluid dynamics in the channel and/or due to the well known effect of contact angle saturation of the electrowetting effect.

The speed of the water front typically is in the order of centimeters per second and preferably between 0 and 50 centimeters per second, as 28 centimeters per second yields a switching speed between the black and the white state of about 1 millisecond for a pixel cell size of 0.2 millimeters (having a 0.28 millimeters diagonal size) when the reservoir is positioned in the corner of the pixel cell, which is compatible with displaying video content on the display apparatus. In this simple calculation only the influence of the electromechanical force and the counteracting force have been taken into account; other forces, such as the drag force that reduce the speed of the water front with the distance of the water front from the reservoir, have not been taking into account.

As also indicated in the Figure is the effect of a direct voltage supplied to a further pixel cell terminal. This is indicated by 'DV-intermediate' by applying a possible additional voltage to the system by an additional direct voltage terminal 4 to lower the switching voltage when driving the polar fluid into the channel. This direct voltage creates a basic supply voltage in the pixel cell that lowers the switched voltage on the pixel needed to switch the pixel towards black. At the same time the retraction speed of the water front is lowered due to a minimal electromechanical force that is provided by the basic supply voltage. When the direct voltage is increased to a value that corresponds to part III the water front will move into the channel irrespective of the switched voltage level.

Depending on the channel geometry, the materials used, including the polar and non-polar fluid mixtures, the layer thicknesses and other specific geometrical and layout choices of the display apparatus and its pixels, the voltage in the stable part of the graph (part II) may be typically around 8V and the voltage at the onset of the water moving into the channel (start of part III) may be typically around 10V. The sum of the voltages squared, being proportional to the electromechanical force in the channel, is then $2\times8^2=128V^2$ for the stable condition and $2\times10^2=200V^2$ for the start of the water moving into the channel, where two equally sized bottom and top channel surface capacitors are assumed. These electromechanical forces are for relative use and reference only, and it is understood that similar parts I, II, and III could be achieved using only one surface capacitor or a variety of other liquid or capacitor arrangements.

Figure 5:
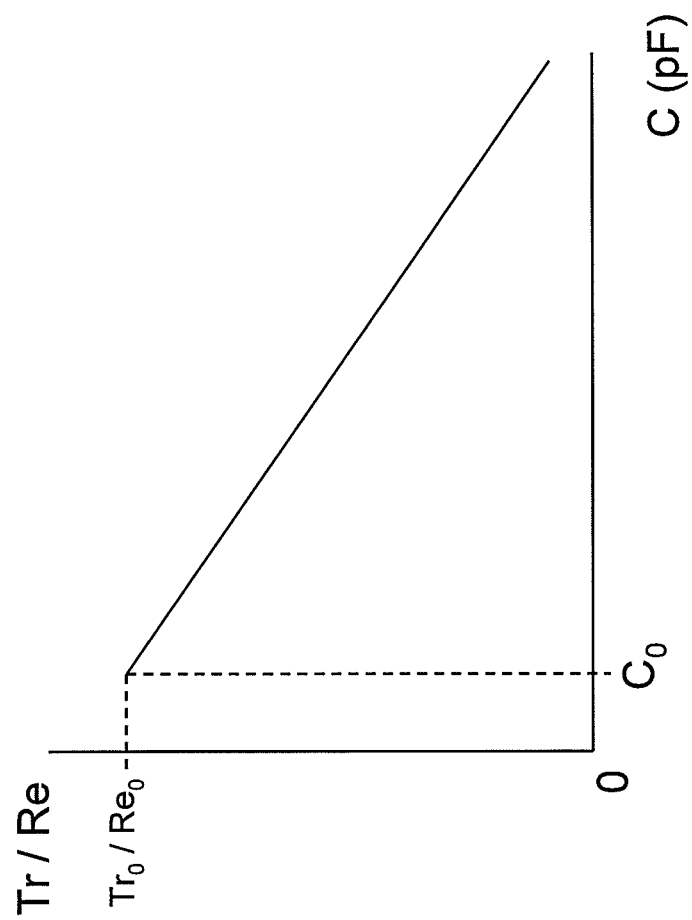
FIG. 5: is a graph depicting transmission or reflection versus pixel capacitance.

FIG. 5: Transmission or Reflection Versus Pixel Capacitance

FIG. 5 shows a relation between the pixel capacitance and the transmission or reflectivity of the pixel cell. During a pixel color transition, oil in the channel 23 (see FIG. 3) is replaced by water or vice versa. This replacement changes the capacitance of the pixel. This affects the driving behavior of the pixel cell. The supply voltage will be reduced by an increasing capacitance of the pixel or will increase by a decreasing capacitance of the pixel, when the amount of charge is kept equal, corresponding to the known relationship $Q=C\cdot V$, in which Q=electric charge
C=capacitance
V=voltage difference over the plates For the capacitance C applies $C=\in A/d$, in which
$\in$=permittivity
A=surface area of the parallel plates
d=distance between the plates The channel 23 filled with an oil layer of approximately 3-5 micrometers acts as a single capacitor with substantially the oil as a dielectric. The dielectric constant $\in$ of oil is approximately 2.5. A channel filled with water acts as a capacitor where the interface of the conducting water with the channel surface forms a capacitor with the channel electrode.

The minimal capacitance, denoted 'C0', is reached when the water is maximally retracted into the reservoir and is determined by all parasitic capacitances in the pixel, the residual channel capacitance and possibly the storage capacitor that can be added to the pixel. The maximal pixel transmission or reflectance, denoted 'Tr0/Re0', is reached at a pixel capacitance C0 and is the white state of the pixel when a black polar fluid and a white, transparent or diffusely scattering non polar fluid are used for instance.

Depending on the channel geometry, the materials used, including the polar and non-polar fluid mixtures, the layer thicknesses and other specific geometrical and layout choices of the display apparatus and its pixels, C0 can have the value of 1 pF, while the maximal pixel capacitance can be as large as 8 pF for pixels of 200 micron×200 micron, while the maximum reflection can be 80% of perfect white, with a contrast ratio of 15.

In one aspect of the invention, the present pixel state of a cell may be taken into account when the driver 5 is instructed to vary the pixel display property. While using current state information to obtain a desired pixel state in some aspects may be reminiscent to prior art techniques, the present pixel cell, in its capacitive behavior provides challenges to efficiently drive the fluid to a desired fluid state which have no precedent. Indeed, due to the capacitive behavior one has to take into account that the supply voltage will relax to a stable voltage regime where the fluid front is immobile. To solve this, in one aspect, the display controller is arranged to control the driver as a result of pixel image information inputted in the display controller. The display controller comprises a state lookup table storing, for a respective pixel cell, the current pixel cell display property. The display controller is further arranged to calculate the electrical charge as a function of current pixel cell display property and controls the driver to supply the calculated electrical charge. In practice, as a calculating function, a further lookup table may be used to determine the electrical charge associated with a respective pixel state transition dependent on a present pixel state.

FIG. 6: Example voltage addressing circuit schematics wherein in the following, the electrical charge is provided by a voltage pulse, other variants are possible, in particular, a plurality of voltage pulses or by continuously charging the pixel cell (reference is made to FIG. 11).

FIG. 6 shows a number of electrical schematics of pixels using so-called voltage addressing. FIGS. 6A and B show two embodiments of a 2-terminal circuit; FIGS. 6C and D show two embodiments of a 3 terminal circuit. Reference is made to FIG. 3 for a detailed schematic of the pixel cell 2.

The circuit is addressed as follows.

Typically, the display is refreshed a number of times per second. The frame time is defined as the time wherein all the pixels of a display are refreshed once. The frame time comprises a line selection time, wherein the active elements of all switching circuits 9 connected to one row 7 are activated, followed by a hold time, wherein the other rows are sequentially addressed.

During the line selection time the column electrodes 8 supply the switched voltage to the switched terminals of the switching circuits connected to the selected row. At the end of the line selection time, the switched voltage may be substantially equal to the column electrode voltage. This voltage may induce a certain movement of the polar fluid 24 in the channel 23 during the frame time.

During the hold time all switching circuits connected to the row are deactivated. The charge supplied via the switching circuits to the switched terminal 10 during the line selection time is substantially retained on the switched terminal until the line selection time of the next frame.

In FIG. 6A (Two terminal circuit—top and bottom) the top and the bottom electrodes are connected. The top electrode is common for all pixels in the display, while the bottom electrode is connected to the switching element, e.g. a thin film transistor (TFT). The circuit may also contain a storage capacitor. The water is not connected. The part of the channel occupied by water forms two capacitors in series between the top and the bottom electrodes; the rest of the channel forms one capacitor between the two electrodes where the oil forms part of the dielectric.

In FIG. 6B (Two terminal circuit—polar fluid and bottom) water and the bottom electrodes are connected. This has the advantage that no top electrode needs to be supplied to the display resulting in simplified manufacturing. The top channel surface may preferably have a small Young's angle that is close to 90 degrees in order to reduce the net counteracting force that has to be overcome by the channel surface that is supplied by a voltage. The water electrode is connected to a terminal 4 that may be common for all pixels in the display or may be common for each row of pixels in the display. The bottom electrode is connected to the switching circuit that has the same schematics as in FIG. 6A. It is also possible to interchange the connection of the water and the bottom electrodes, as is done in FIG. 6C for a three terminal schematic. Accordingly, it is shown that the switched terminal 10 is coupled to a second channel electrode and the direct voltage terminal 4 is coupled to a contact electrode contacting the conductive polar fluid.

In FIG. 6C (Three terminal circuit—polar fluid TFT) a three terminal configuration is shown where the top electrode, the bottom electrode and the water electrode are connected. The water electrode is connected to the switching circuit, the top electrode is typically common for all pixels in the display and the bottom electrode is connected to a further electrode that is typically common for one row of pixels in the display. The bottom electrode may be used to provide a direct voltage to the pixel to bring the pixel in an intermediate condition or can be held at the same voltage as the top electrode. Accordingly, it is shown that the switched terminal 10 is coupled to the conductive polar fluid and the direct voltage terminal 4 is coupled to a second channel electrode.

In FIG. 6D (Three terminal circuit—bottom TFT) another embodiment of a three terminal configuration is shown where the switching circuit is connected to the bottom electrode, while the water electrode is connected to the further electrode.

During addressing a pixel can be switched to black, a so-called to-black transition, or to white, a so-called to-white transition, where the water is either moving into the channel or back into the reservoir, respectively.

In the case of a to-black transition, clear oil in the channel is replaced by black water. The water, containing ionic content, forms a parallel conductive plate at the part of the surface 27 of the channel that is covered by an electrode thereby forming capacitors with the fluoropolymer and optional additional isolating layers as the dielectric. Depending on the embodiment of the switching circuit 9 the capacitors are placed in series or only one of the capacitors is connected to the switching circuit. Because of the large difference in thickness of the dielectric, i.e. the distance between the plates d, both the total capacitance of the capacitors placed in series as well as the total capacitance of one of the capacitors in the pixel, C, will become larger.

After the line selection time, the charge on the pixel, Q, will substantially persist, the pixel capacitance, C, will increase and the voltage difference, V, over the pixel capacitors will decrease. Therewith the electromechanical force Fem that is proportional to the voltage squared $V^2$ will decrease. V will continue to decrease until the electromechanical force Fem is balanced with the counteracting force and possible other forces, and the polar fluid front stabilizes. This balance is reached at or near the part II region of FIG. 4. Alternative or additional driving mechanisms to provide a counteracting force are conceivable, such as additional electrodes placed in the reservoir.

In the case of a to-white transition, black water, containing ionic content, is replaced by clear oil and the capacitance of the pixel will decrease, as explained above. After the line selection time, the charge on the pixel, Q, will substantially persist and the voltage difference, V, over the pixel capacitors will increase. Therewith the electromechanical force Fem will increase until Fem is in equilibrium with the Young-Laplace droplet forming force and possible other forces and the water front stabilizes.

Figure 7:
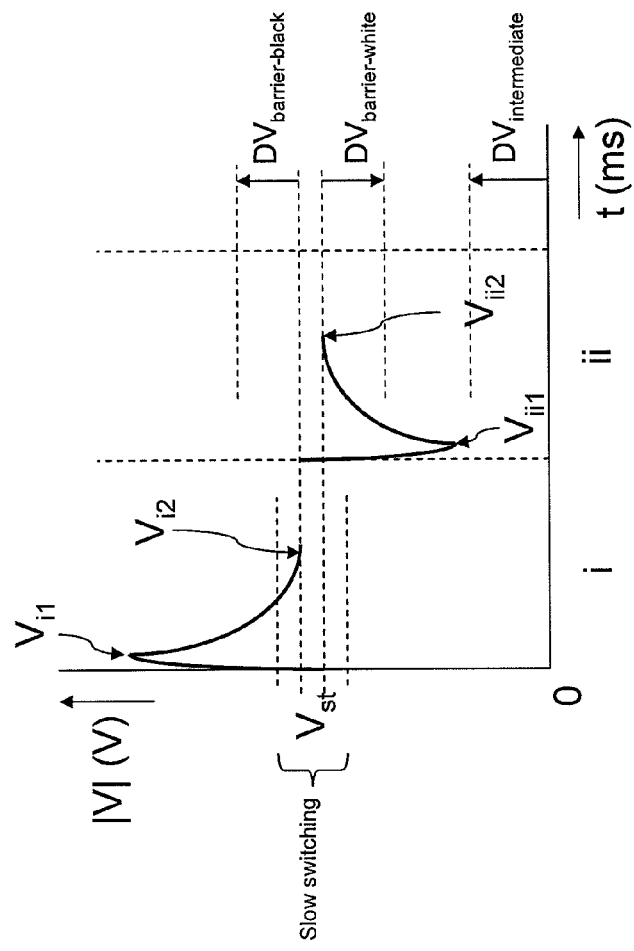
FIG. 7: is a graph depicting voltage pulse addressing.

FIG. 7: Voltage Pulse Addressing

In these drive schemes, it is considered that the voltage addressing pulse is relatively short in comparison to the cell response time, wherein the cell relaxes, after addressing the voltage, to a new pixel state. Accordingly, in these examples the driver is arranged to supply the electric charge by providing a switched voltage, the switched voltage resulting in a supply voltage that may be different from the stable voltage. The supply voltage may thus result in a movement of the fluid front as explained with reference to FIG. 4. FIG. 7 shows the absolute value of the switched voltage as a function of time. Periods denoted by 'i'' and 'ii' can be separate frames times but can also be part of one frame time. The labels 'Vst', 'slow switching', 'DVbarrier-white', 'DVbarrier-black' and 'DVintermediate' have the same meaning as in previous figures.

In period i a voltage pulse with amplitude Vi1 is applied to the switched terminal during the line selection time. During the rest of period i the switched voltage decreases to Vi2 due to the to-black transition of the pixel. If the period is long enough the water front will stabilize at a new position and Vi2 is substantially equal to a voltage of the stable region. The stable region can also have a locally increased stable voltage level due to a to-black barrier.

A way to control the grey level of the pixel is now:

1: Retrieve the current switching state of the pixel from memory, Li, and retrieve C(Li) from a lookup table or a formula based on the graph in FIG. 5;

2: Retrieve the next switching state of the pixel, Lii, and retrieve C(Lii);

3: Retrieve the voltage, Vi2, at Lii at which the fluid front stops moving;

4: Apply a switched voltage pulse to the pixel during a line selection time wherein the switched voltage is proportional to a calculated pixel capacitance corresponding to a new pixel cell display property and inversely proportional to a calculated pixel capacitance corresponding to the current pixel cell display property. That is, the voltage pulse is proportional to C(Lii) and Vi2 and inversely proportional to C(Li), i.e. Vi1=C(Li)/C(Li)×Vi2;

5: Apply a minimum waiting time where the switching circuit is deactivated that is long enough to allow the fluid front to change to the position that corresponds to switching state Lii. During this time other rows of pixels can be addressed.

It is assumed that the line selection time is much shorter than the switching time of the pixel; otherwise the formula in FIG. 7 will need a compensation term for switching during the line selection time. Typically this compensation is not needed as a line selection time for a VGA display with 50 frames per second is about 40 microseconds, while the switching time of the polar fluid is in the order of milliseconds.

In period ii a voltage pulse with amplitude Vii1 is applied to the switched terminal during the line selection time. During the rest of period ii the switched voltage increases to Vii2 due to the to-white transition of the pixel. If the period is long enough the water front will stabilize at a new position and Vii2 is substantially equal to a voltage of the stable region. The stable region can also have a locally decreased stable voltage level due to a to-white barrier.

A way to control the grey level of the pixel during period ii is the same as shown for period i.

Figure 8:
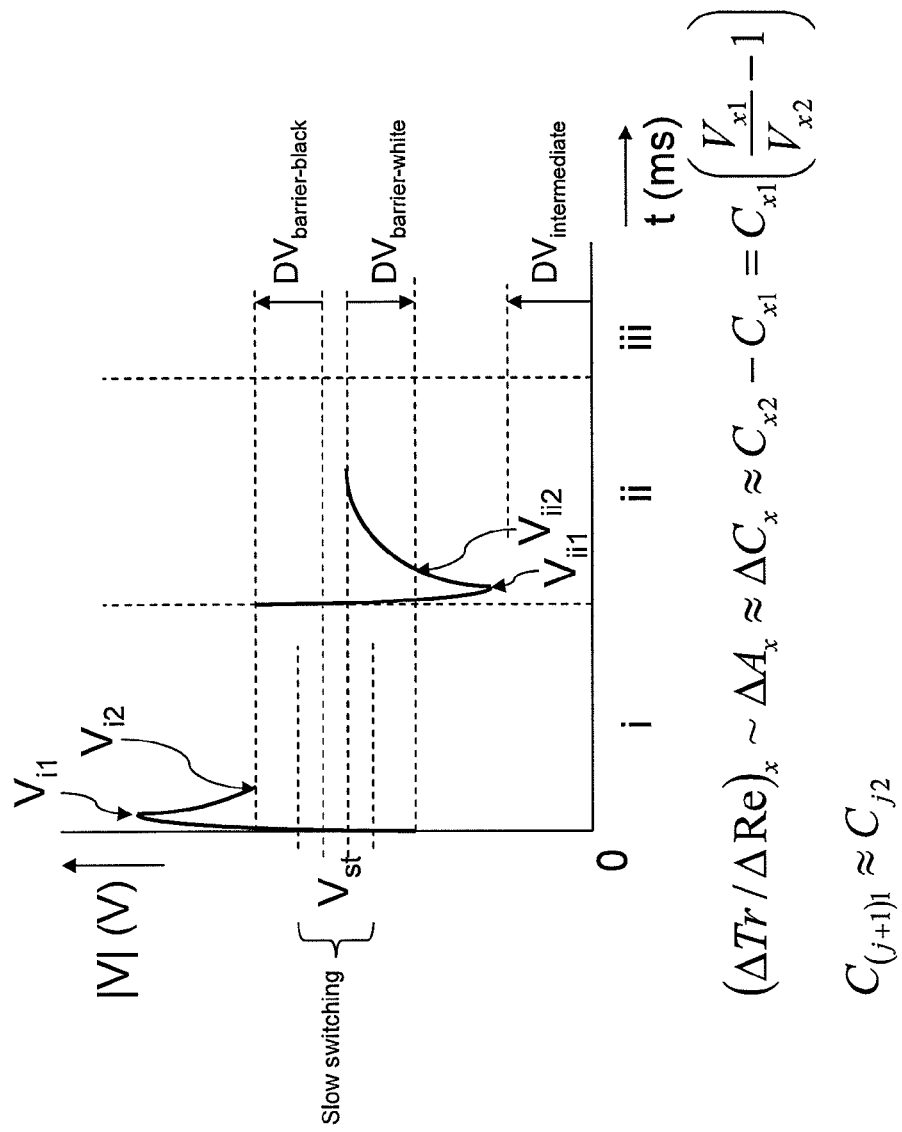
FIG. 8: is a graph depicting voltage pulse addressing with barrier driving.

FIG. 8: Voltage Pulse Addressing with Barrier Driving

FIG. 8 shows the case where the water front stops at a local barrier in the channel that defines the new or an intermediate switching state of the pixel in period i. The barrier locally increases the width of the stable region. The effect of the barrier is therefore that the fluid front will stop at a predefined position and at a voltage that is higher or lower than the normal stable voltage region for a to-black or a to-white barrier respectively. The predefined position defines an accurate switching state of the pixel without any accumulated switching error. Barriers can be applied by methods described in U.S. application No. 61/159,673 under section 'barriers' and their function in eliminating switching errors is also described therein.

In period ii the pixel is switched from the barrier position to the new switching state of the pixel.

A way to control the grey level of the pixel when using a local barrier as an intermediate switching state is:

1: Retrieve the current switching state of the pixel from memory, Li, and retrieve C(Li) from a lookup table or a formula based on the graph in FIG. 5;

2: Retrieve the next switching state of the pixel, Liii, and retrieve C(Liii);

3. Determine the local barrier switching state Lii. Typically Lii is a barrier switching state closest to Li or Liii, where preferably switching from Lii to Liii is done with a to-white transition as that requires a low voltage.

4: Retrieve the voltage, Vi2, at Lii at which the fluid front stops moving at the local barrier;

5: Apply a voltage to the pixel during a line selection time that is proportional to C(Lii) and Vi2 and inversely proportional to C(Li), i.e. Vi1=C(Lii)/C(Li)×Vi2;

6: Apply a minimum waiting time where the switching circuit is deactivated that is long enough to allow the fluid front to change to the position that corresponds to the local barrier switching state Lii. During this time other rows of pixels can be addressed.

7: Determine if the new switching state of the pixel is identical to the barrier switching state; if not apply step 1-5 as outlined at FIG. 7 with the barrier state, Lii, as the current switching state, Li.

Figure 9:
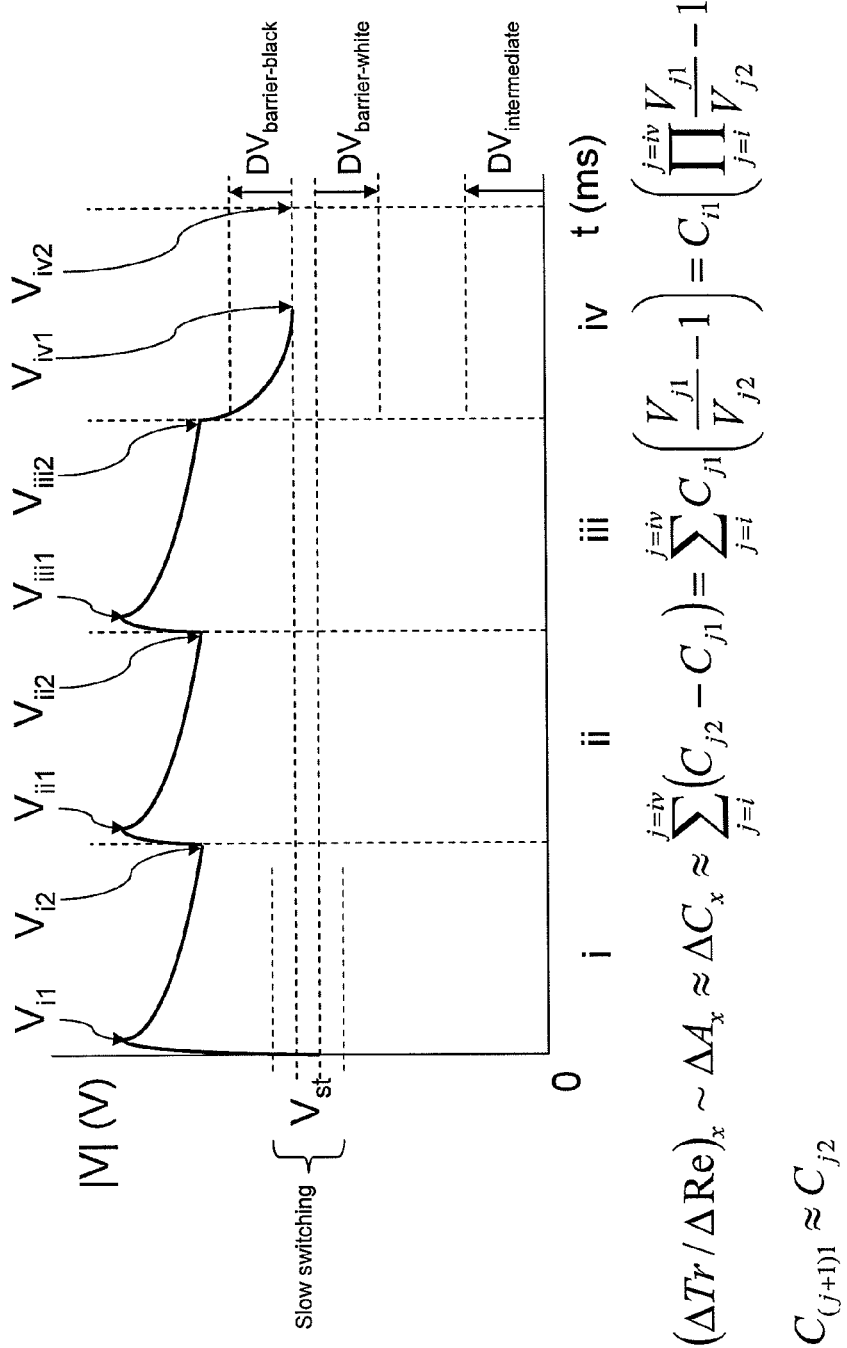
FIG. 9: is a graph depicting multiple voltage pulse addressing.

FIG. 9: Multiple Voltage Pulse Addressing

While the preceding examples of FIGS. 7 and 8 showed the driver being controlled to provide a switched voltage in the form of at least a single voltage pulse during a row selection time FIG. 9 shows an embodiment where the driver is controlled to provide a switched voltage in the form of a plurality of switched voltage pulses to drive the pixel cell to a new pixel cell display property; at least in a transition where the polar fluid moves into the channel. In that case the new switching state of the pixel is achieved by applying multiple consecutive voltage pulses to the switched terminal. The advantage is that the amplitude of the voltage pulse can be reduced as the same amount of charge is supplied to the pixel in multiple line selection times compared to the drive scheme of FIG. 7. This is especially beneficial for a to-black transition of the pixel as that required relatively high voltage due to the increase of the pixel capacitance during a to-black transition. Lowering of the voltage pulses results in a lower power consumption of the display, as that scales with the voltages squared, and it reduces the electrical stress on the components of the display, such as the switching elements, the crossings of the electrodes and the driver ics, thereby improving lifetime and reducing cost.

When the capacitance of the pixel, that is proportional to the switching state, is changed from Cx to Cy in n equal steps, the voltage pulses Vj1 that need to be supplied to the pixel during the n line selection times is reduced by sqrt(n) compared to the case where the voltage pulse is applied in 1 step, i.e. Vj1=[Cy/Cx]^1/n×Vj2. For example, if Cx is equal to 2 pF and Cy to 6 pF and V stable is 6V the voltage pulse needed to switch the pixel in one pulse is: V1=6/2×6=18V. When doing this with 2 pulses Vj1=sqrt[6/2]×6=10.4V and with 3 pulses Vj1=8.7V.

The plurality of switched voltage pulses may be provided in multiple row addressing periods. For example, they may be applied in separate frame times, but can also be applied in one frame time with multiple line selection times separated by a minimum waiting time where the switching circuit is deactivated that is long enough to allow the fluid front to change to an intermediate switching state. During this time other rows of pixels can be addressed. While FIG. 9 shows the plurality of voltage pulses of substantially equal height, the plurality of pulses may vary in switched voltage. For example, the variation of the voltage may take into account a varying counteracting force when the polar fluid moves into the channel. In particular, the counteracting force may increase due to a drag factor, which increases due to fluid dynamics effects of the polar fluid in the channel. Accordingly, the switched voltage may be controlled to increase, at least in a transition where the polar fluid moves into the channel; for a subsequently provided voltage pulse.

It is possible to use a different length for the different periods. This can be advantageous when the switching speed changes as a function of the switching state of the pixel, e.g. when the speed of the water front into the channel is slowed due to the drag force as a function of distance from the reservoir. The voltage amplitude during each pulse can then be constant while the last period is taken shorter than the first to have the same change in switching state per period. This can help to generate accurate grey levels.

It is possible to use different voltage amplitude per period. For example, the amplitude of the first pulse can be lower than the amplitude of the last pulse in order to have the same change in switching state per period. This may help to generate accurate grey levels.

The methods can be combined for an optimal result.

Figure 10:
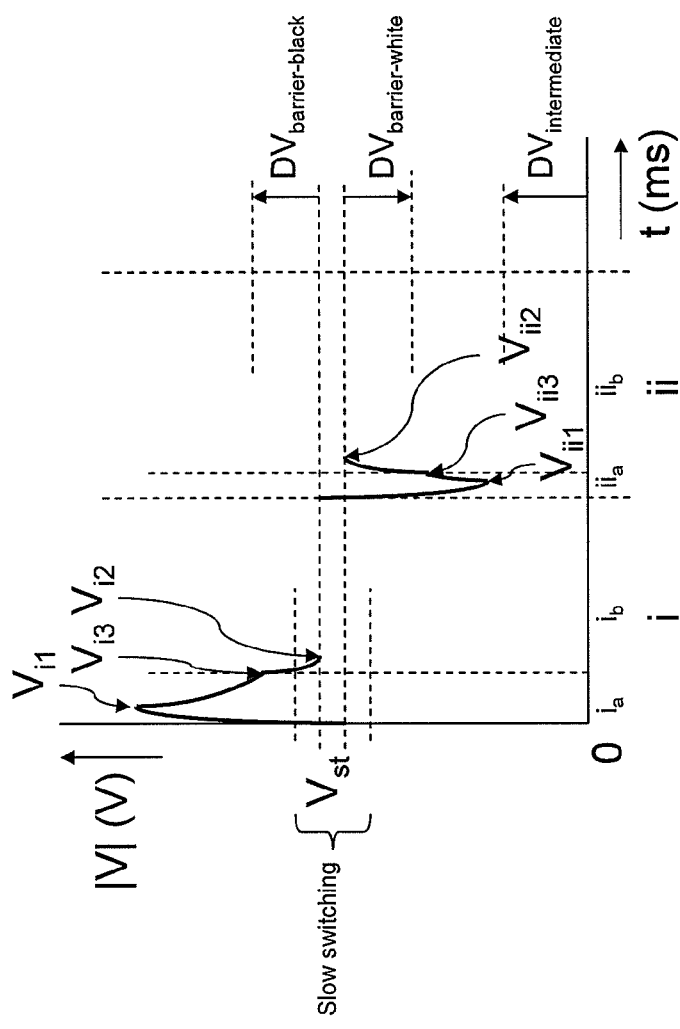
FIG. 10: is a graph depicting voltage pulse with cutoff addressing.

FIG. 10: Voltage Pulse with Cutoff Addressing

To further enhance the driving behavior of the electrofluidic cell, advantage may be taken from the stable voltage effect. As explained in the preceding, the fluid movement stops when the supply voltage equals the stable voltage. While the above voltage addressing schemes account for the capacitive effect of the cell to reach a stable voltage after a certain period, in a preferred embodiment, for a last one in a plurality of pulses; the switched voltage corresponds to the stable voltage. Thus, a drive scheme may be applied using a 'fast' switching region well above the slow switching region of the pixel cell by supplying a first voltage pulse which drives the cell to a new state; accordingly, a cut-off pulse may be addressed exactly timed with a moment that the fluid front corresponds to a desired pixel state.

FIG. 10 shows the same drive scheme as shown in FIG. 7, but now with the addition of a so-called cut-off pulse between voltage levels Vj3 and Vj2, where j=i or ii.

Period i shows a to-black transition of a pixel while period ii shows a to-white transition of a pixel. During period is the pixel is charged to Vi1 during the line selection time and after that during the to-black transition the voltage is reduced to Vi3. During a second line selection time at the beginning of period ib the switched voltage is set to voltage Vi2 in the stable region that stops the movement of the water front.

During period iia the pixel is charged to Vii1 during the line selection time and after that during the to-white transition the voltage is reduced to Vii3. During a second line selection time at the beginning of period iib the switched voltage is set to voltage Vii2 in the stable region that stops the movement of the water front.

The advantage of this drive scheme is that the region indicated by 'slow switching' on the vertical axis is not used, thereby decreasing the switching time of the pixel.

A way to control the grey level of the pixel during period i is now:

1: Retrieve the current switching state of the pixel from memory, Li, and retrieve C(Li) from a lookup table or a formula based on the graph in FIG. 5;

2: Retrieve the next switching state of the pixel, Lii, and retrieve C(Lii);

3: Retrieve the voltage, Vi3, at Lii at which the fluid front movement will be stopped at time ia. To determine this voltage the water front speed as a function of applied voltage and the length of period ia must be stored in memory (or alternatively a table of the movement of the water front (or in general the change in switching state) during time ia as a function of the switched voltage);

4: Apply a voltage to the pixel during a line selection time that is proportional to C(Lii) and Vi3 and inversely proportional to C(Li), i.e. Vi1=C(Lii)/C(Li)×Vi3;

5: Apply a minimum waiting time where the switching circuit is deactivated that is long enough to allow the fluid front to change to the position that corresponds to switching state Lii. During this time other rows of pixels can be addressed.

FIG. 11: Example Voltage Rail Addressing Schematics

FIG. 11 shows a number of electrical schematics of pixels using so-called voltage rail addressing. Reference is made to FIG. 3 for a detailed schematic of the pixel cell 2.

FIGS. 11A and B show two embodiments of a 2-terminal circuit; FIGS. 11C and D show two embodiments of a 3 terminal circuit.

FIG. 11A (Two terminal circuit—top and bottom) shows a schematic representation of a switching circuit 9 comprising a switched charge pump 1005 configured to supply the electrical charge to switched terminal 10 of pixel cell 2 that is connected to the bottom surface electrode. The top electrode is common for all pixels in the display. The water is not connected. The voltage supplied to the charge pump addressing terminal 1003 determines the current supplied by the charge pump. The charge pump is also connected to a continuously charging voltage source electrode 1002, also referred to as the voltage rail, that may supply more than one voltage level and that may be connected to the driver with one common connection for all pixels or with one connection per row of pixels. The charge pump is implemented by use of a thin film transistor, although implementations with more than one TFT, current mirrors or multiple concatenated buffer stages are also possible. The addressing TFT 1004 is connected to the charge pump addressing terminal 1003 of the charge pump. The charge pump contains a power TFT 1005 that is connected to the charge pump addressing terminal at its gate terminal and the switched terminal 10 and the voltage rail 1002 on its source and drain terminals.

The circuit is addressed as follows. Typically, the display is refreshed a number of times per second. The frame time is defined as the time wherein all the pixels of a display are refreshed once. The frame time comprises a line selection time, wherein the addressing TFTs of all switching circuits 9 connected to one row 7 are activated, followed by a hold time, wherein the other rows are sequentially addressed.

During the line selection time the column electrodes 8 supply the addressing voltage to the charge pump addressing terminal of the switching circuits connected to the selected row. At the end of the line selection time, the addressing voltage may be substantially equal to the column electrode voltage. The addressing voltage sets the resistance of the channel of the power TFT and thereby determines the current that can run through the channel. During the hold time all addressing TFTs connected to the row are deactivated. The voltage on the charge pump addressing terminal is substantially retained until the line selection time of the next frame, resulting in a substantially constant resistance of the power TFT during the hold time. During the hold time the pixel capacitance may change when the switched voltage is substantially different than the stable voltage. The combination of the rate of change of the pixel capacitance and the resistance of the channel of the power TFT determines the switched voltage. When the current is high enough the voltage may be substantially the same as the voltage on the voltage rail, while at a low current the voltage may be substantially the same as the stable voltage.

The charge pump can supply a continuously charged and therefore substantially constant switched voltage to the pixel cell during a pixel color transition. This is especially beneficial when the pixel capacitance increases during the pixel color transition due to water flowing into the channel, e.g. the to-black transition, as the charge pump buffers the voltage on the charge pump addressing terminal. Due to the buffering the voltage on the charge pump addressing terminal does not substantially relax to the stable voltage region with varying pixel capacitance making it possible to address the charge pump with lower row and column electrode voltages compared to the drive schemes used of FIGS. 7-10. On top of that, the substantially constant switched voltage results in a more constant switching speed compared to a pixel switch as shown in FIG. 7 with a single voltage pulse. The additional circuitry in the switching circuit for addressing the charge pump can have row and column electrodes to set the voltage on the charge pump addressing terminal, but it is also possible that more or less electrodes are used depending on the implementation of that part of the switching circuit and the implementation of the charge pump.

FIG. 11B (Two terminal circuit—polar fluid and bottom) shows another schematic representation of a switching circuit containing a charge pump where the bottom electrode 10 is connected to the charge pump 1005, while the water electrode 4 may be connected to the driver with one common connection for all pixels or with one connection per row of pixels. This has the advantage that no top electrode needs to be supplied to the display resulting in simplified manufacturing. The top channel surface may preferably have a small Young's angle that is close to 90 degrees in order to reduce the net Young-Laplace force that has to be overcome by the channel surface that is supplied by a voltage. It is also possible to interchange the connection of the water and the bottom electrodes, as is done in FIG. 11C for a three terminal schematic.

In FIG. 11C (Three terminal circuit—polar fluid TFT) a three terminal configuration is shown where the top electrode, the bottom electrode 4 and the water electrode 4 are connected. The water electrode 10 is connected to the switching circuit 9 that includes a charge pump 1005, the top electrode is typically common for all pixels in the display and the bottom electrode is connected to a further electrode that is typically common for one row of pixels in the display. The bottom electrode may be used to provide a direct voltage to the pixel to bring the pixel in an intermediate condition or can be held at the same voltage as the top electrode.

In FIG. 11D (Three terminal circuit—bottom TFT) another embodiment of a three terminal configuration is shown where the switching circuit including a charge pump is connected to the bottom electrode, while the water electrode is connected to the further electrode.

Figure 12:
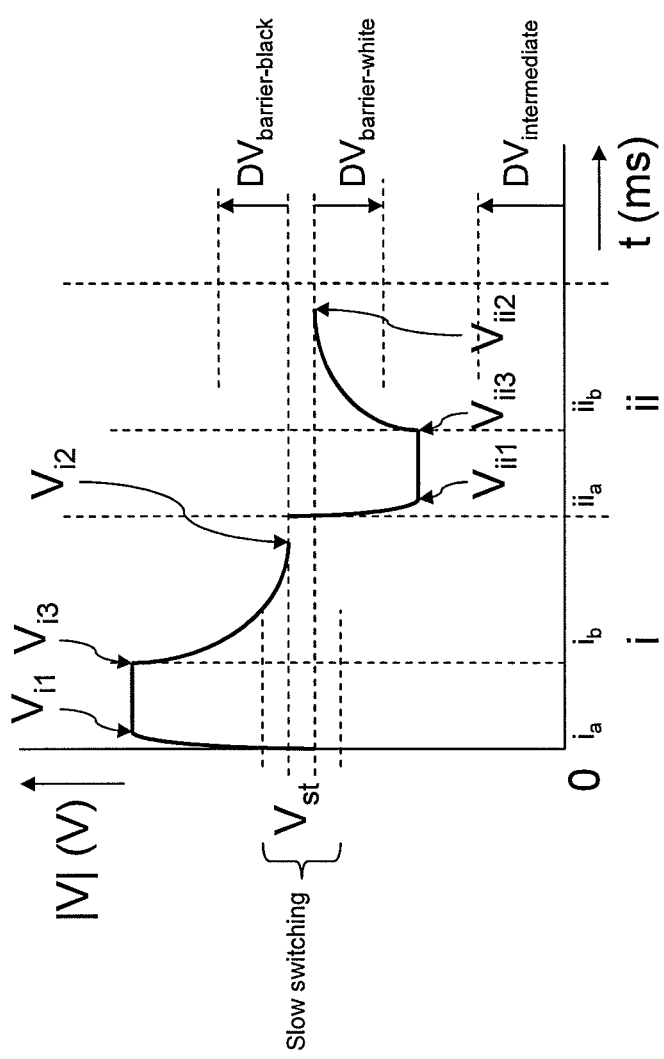
FIG. 12: is a graph depicting voltage rail addressing.

FIG. 12: Voltage Rail Addressing

FIG. 12 shows the absolute value of the switched voltage as a function of time. Periods denoted by 'i" and 'ii' can be separate frames times but can also be part of one frame time. The labels 'Vst', 'slow switching', 'DVbarrier-white', 'DVbarrier-black' and 'DVintermediate' have the same meaning as in previous figures.

In period i a pixel is switched to black. During the line selection time at the start of period ia the charge pump addressing terminal is charged to a voltage that results in a switched voltage with amplitude Vi1. During the rest of period ia this voltage is substantially constant due to the continuously charging voltage rail and the substantially constant resistance of the channel of the power TFT and therefore Vi3 is substantially equal to Vi1. The capacitance change of the pixel will be substantially constant as long as the completely white or black state is not reached. At the end of period ia the pixel capacitance will be Ci3. During the line selection time at the start of period ib the charge pump addressing terminal is charged to a voltage that deactivates the power TFT. This effectively isolates the switched terminal from the voltage rail. During the rest of period ib the switched voltage decreases to Vi2 due to the to-black transition of the pixel similar to period i of the voltage addressing scheme as shown in FIG. 8. If the period is long enough the water front will stabilize at a new position and Vi2 is substantially equal to a voltage of the stable region. The stable region can also have a locally increased stable voltage level due to a to-black barrier.

In order to accurately determine the value of Vi1 the simple equation as shown below the figure can be used.

A way to control the grey level of the pixel is now:

1: Retrieve the current switching state of the pixel from memory, Li, and retrieve C(Li) from a lookup table or a formula based on the graph in FIG. 6;

2: Retrieve the next switching state of the pixel, Lii, and retrieve C(Lii);

3: Retrieve the voltage, Vi2, at Lii at which the fluid front stops moving;

4: Apply a voltage Vi1 to the pixel during ia that is determined from a lookup table that takes into account the sum of the substantially constant switching speed during ia and the decreasing switching speed during ib, where during ib the capacitance change is proportional to Ci3 and Vi1 and inversely proportional to Vi2, i.e. substantially equal to: Ci3× (Vi1/Vi2−1).

5: Apply a constant waiting time ia where the switched voltage is substantially constant followed by a minimum waiting time ib where the power TFT is deactivated and that is long enough to allow the fluid front to change to the position that corresponds to switching state Lii. After the line selection times at the start of period ia and ib other rows of pixels can be addressed as the addressing TFT is then deactivated.

In period ii a pixel is switched to white according to the same principles as described for period i. A way to control the grey level of the pixel is the same as shown for period i.

Figure 13:
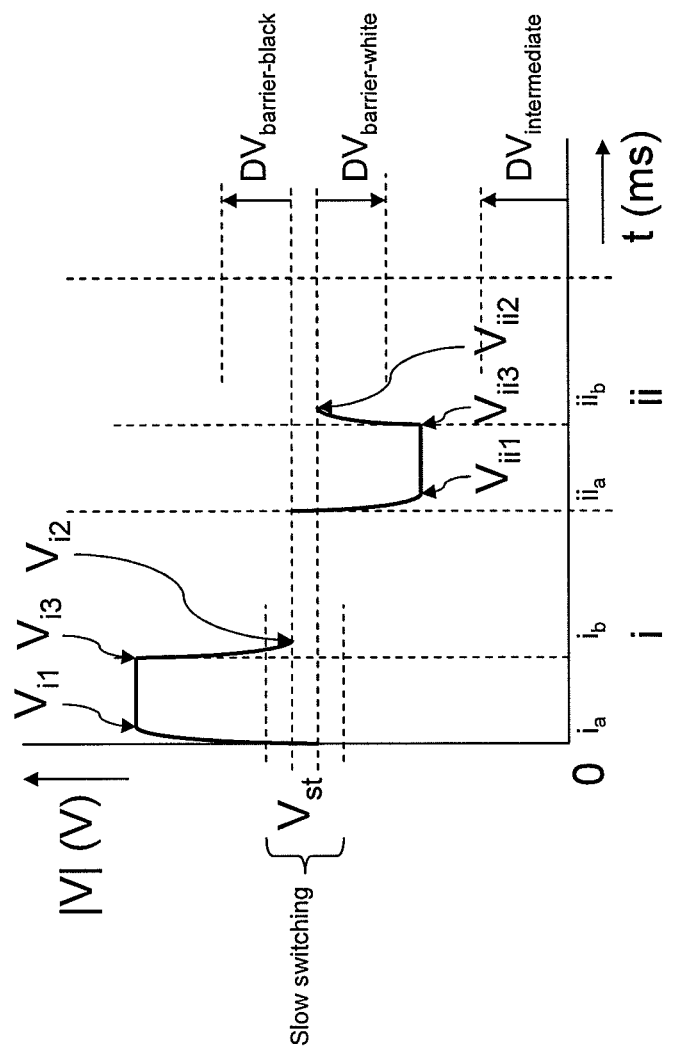
FIG. 13: is a graph depicting voltage rail with cut-off addressing.

FIG. 13: Voltage Rail with Cut-off Addressing

FIG. 13 shows the same drive scheme as shown in FIG. 12, but now with the addition of a so-called cut-off pulse between voltage levels Vj3 and Vj2, where j=i or ii.

Period i shows a to-black transition of a pixel while period ii shows a to-white transition of a pixel. During period ia the pixel is charged to Vi1 during the line selection time and after that is substantially constant. During a second line selection time at the beginning of period ib the switched voltage is set to voltage Vi2 in the stable region that stops the movement of the water front. Period ib can be as short as a line selection time as the water front has then stopped moving or be as long as the rest of the hold time to address other rows of the display. The switched voltage can be set to a voltage in the stable region in different ways. A possible way is to supply the charge pump addressing terminal with a voltage that sets the resistance of the channel of the power TFT to a value resulting in the supply of a switched voltage in the stable region. Another way is to change the voltage supplied on the voltage rail to a voltage in the stable region and to supply the charge pump addressing terminal with a voltage that sets the resistance of the channel of the power TFT to value resulting in a switched voltage that is substantially equal to the voltage on the voltage rail. After the line selection time the power TFT can be deactivated.

During period iia the pixel is charged to Vii1 during the line selection time and after that during the to-white transition the switched voltage is substantially constant. During a second line selection time at the beginning of period iib the switched voltage is set to Vii2 in the stable region that stops the movement of the water front.

The advantage of this drive scheme is that the rate of change of the pixel capacitance (and therefore the rate of change of the switching state of the pixel) is substantially constant all the time. The region indicated by 'slow switching' on the vertical axis is not used, thereby decreasing the switching time of the pixel.

A way to control the grey level of the pixel during period i is now:

1: Retrieve the current switching state of the pixel from memory, Li, and retrieve C(Li) from a lookup table or a formula based on the graph in FIG. 5;

2: Retrieve the next switching state of the pixel, Lii, and retrieve C(Lii);

3: Retrieve the voltage, Vi2, at Lii at which the fluid front stops moving;

4: Apply a voltage Vi1 to the pixel during ia that is determined from a lookup table that is based on the substantially constant change of the pixel capacitance during ia.

5: Apply a constant waiting time ia where the switched voltage is substantially constant 6: Apply a second line selection time after period ia at the beginning of period ib where the switched voltage is set to Vi2 in the stable region to stop the movement of the water front at a position that corresponds to switching state Lii. After the line selection times at the start of period ia and ib other rows of pixels can be addressed as the addressing TFT is then deactivated.

Figure 14:
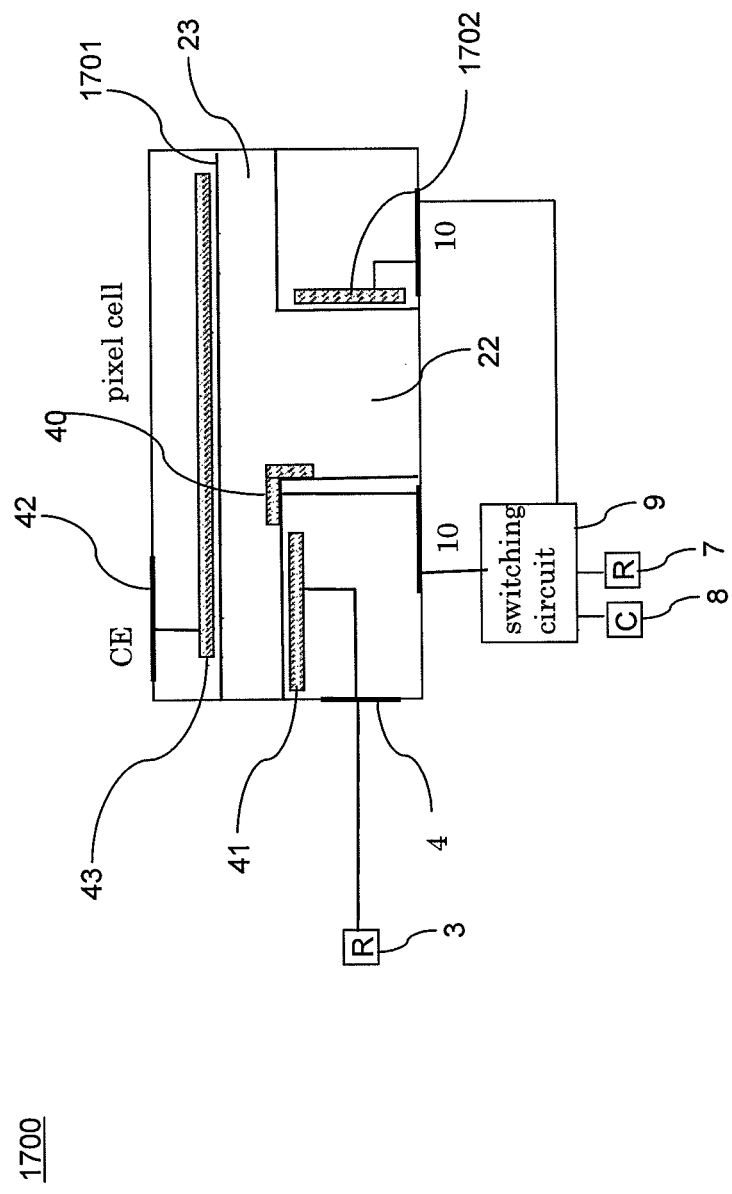
FIG. 14: schematically depicts an embodiment of the apparatus according to the present invention, wherein an additional electrode is provided in the reservoir.

FIG. 14: Bi-stable Configuration—Switching Speed Versus Supply Voltage

FIG. 14 shows an embodiment 1700 of the apparatus according to the present invention, wherein an additional electrode is provided in the reservoir to replace or enhance the Young-Laplace force as counteracting force to the electromechanical force. In particular, for low-energy schemes the channel surface 1701 wetting property may be arranged to stabilize the polar fluid front in absence of a supply voltage; and wherein a reservoir electrode 1702 is arranged to move the polar fluid out of the channel 23 and into the reservoir 22. This is an embodiment wherein the water front in the channel keeps its position at 0V, due to surface treatment of the fluoropolymer on the channel surface. Alternative stabilization methods are also possible. Pulling the water back into the reservoir is done by an additional electrode 1702. As schematically indicated, the switching circuit may be alternatively coupled to any of the additional electrode 1702 or channel electrode 41 and water electrode 40. Top electrode 43 may be set to a common voltage via common terminal 42. The remaining electrodes may be charged to set a counteracting electromechanical force and/or to set an intermediate condition of the pixel cell (biased condition). Accordingly, it may be possible with limited switching circuitry to drive the fluid either way in the pixel cell—as further explained herein below with reference to FIG. 15.

Figure 15:
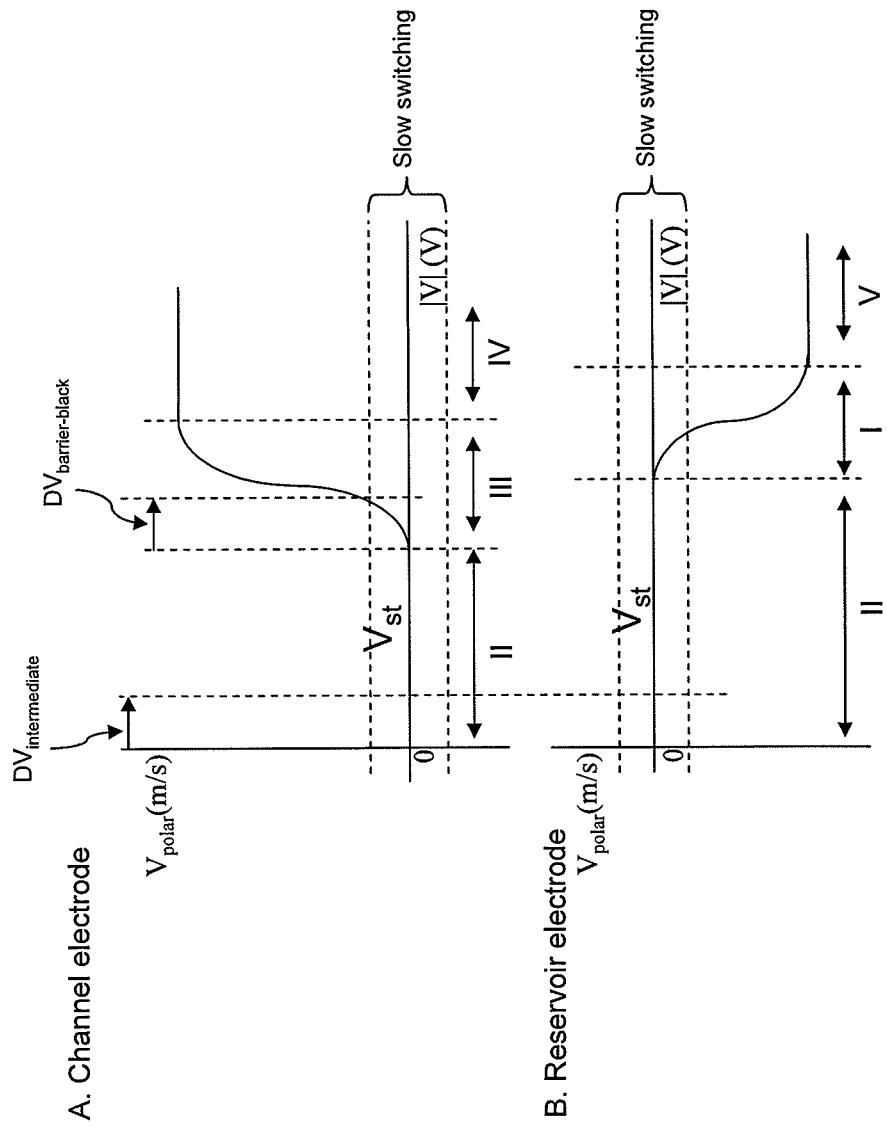
FIG. 15: is a graph depicting properties of the speed of the water front as a function of supply voltage.

FIG. 15 shows a schematic representation of the speed of the water front, as a function of the supply voltage V over the channel surface 27 for the bi-stable embodiment. In the bi-stable embodiment the channel surface wetting property is arranged to stabilize the polar fluid front in absence of a supply voltage and an additional reservoir electrode is arranged to move the polar fluid out of the channel and into the reservoir. The water front in the channel keeps its position at 0V, due to surface treatment of the fluoropolymer on the channel surface, surface tensions of the liquids, or geometrically varying capillaries that are converging or diverging, to name a few options. Alternative stabilization methods are also possible. Pulling the water back into the reservoir is done by an additional reservoir electrode that may be driven by a separate circuit that is part of the switching circuit for supplying a switched voltage that moves the polar fluid into of the channel and for supplying a voltage to the reservoir electrode that moves the polar fluid out of the channel.

The x-axis represents the supply voltage over the channel surface; the y-axis represents the speed of the water front. Since the electromechanical force Fem is proportional to the voltage squared $V^2$, the graph is symmetrical around the y-axis, i.e. the system gives a substantially symmetrical response around 0V. Therefore the absolute value of the voltage is shown on the horizontal axis.

In FIG. 15A the channel electrode voltage is shown on the horizontal axis, while it is assumed that the reservoir electrode voltage is at 0V. In FIG. 15B the reservoir electrode voltage is shown on the horizontal axis, while it is assumed that the channel electrode voltage is at 0V. In both graphs, a positive speed means that the water moves into the channel 23 and a negative speed means the water retracts out of the channel and into the reservoir 22. The area in the graphs denoted by 'Slow switching' indicates the area where the switching speed may be too low to allow a high update rate of the display, for example to allow video rate.

The graphs may be roughly divided in five parts where the labels I, II, III, IV have the same meaning as used in FIG. 4. Starting with FIG. 15A, part II is the so-called stable region where the Young-Laplace force is substantially equal to the electromechanical force and the speed of the water front equals zero. The width of the region part II on the x-axis is non-zero due to the effects of wetting hysteresis or a wetting barrier that is inherent to the materials used in the pixel cell 20, or that is purposely added to the pixel cell 20 to create a well-defined width for the region part II. The possible effect of a barrier on the stable region is indicated by the arrow labeled 'DVbarrier-black', indicating the effect of a barrier for the water front when advancing into the channel. The effect of a barrier is to increase the width of the stable region to a higher voltage.

Subsequently, in part III, the electromechanical force becomes larger than the Young-Laplace force; the speed of the water front is positive, which means that the water moves into the channel. In this part, the graph steeply rises until a plateau is reached. The plateau is part IV wherein, although the voltage still increases and therewith the electromechanical force, the speed saturates and levels to a substantially constant value due to friction in the channel and/or due to the well known effect of contact angle saturation of the electrowetting effect.

In the above only the influence of the electromechanical force and the Young-Laplace force have been taken into account; other forces, such as the drag force that reduce the speed of the water front with the distance of the water front from the reservoir, have not been taking into account.

As also indicated in FIG. 15A by 'DVintermediate' is the effect of a direct voltage supplied to a possible further pixel cell terminal. The direct voltage creates a basic supply voltage on the pixel cell that lowers the switched voltage on the channel electrode needed to switch the pixel towards black. When the direct voltage is increased to a value that corresponds to part III the water front will move into the channel irrespective of the switched voltage on the channel electrode.

In FIG. 15B part II is the stable region where the Young-Laplace force is substantially equal to the electromechanical force and the speed of the water front equals zero. The width of the region part II on the x-axis is non-zero due to the effects of wetting hysteresis or a wetting barrier that is inherent to the materials used in the pixel cell 20. Subsequently, in part I, the sum of the electromechanical force and the Young-Laplace force become large enough to pull the water back into the reservoir; the speed of the water front is negative. In this part, the graph falls until a plateau is reached. The plateau is part V wherein, although the reservoir electrode voltage still increases and therewith the electromechanical force, the speed saturates and levels to a substantially constant value due to friction in the channel and/or due to the well known effect of contact angle saturation of the electrowetting effect.

In the above only the influence of the electromechanical force and the Young-Laplace force have been taken into account; other forces, such as the drag force that reduce the speed of the water front with the distance of the water front from the reservoir, have not been taking into account.

The effect of a voltage on the reservoir electrode in FIG. 15A is a shift of parts II, III and IV to a higher voltage, i.e. the electromechanical force created by the reservoir electrode voltage must be overcome by an additional voltage on the channel electrode. The effect of a voltage on the channel electrode in FIG. 15B is a shift of part II, I and V to a higher voltage. It may therefore be preferred to have 0V on the channel electrode when switching to white and 0V on the reservoir electrode when switching to black for a drive scheme with the lowest possible switching voltages.

Figure 16:
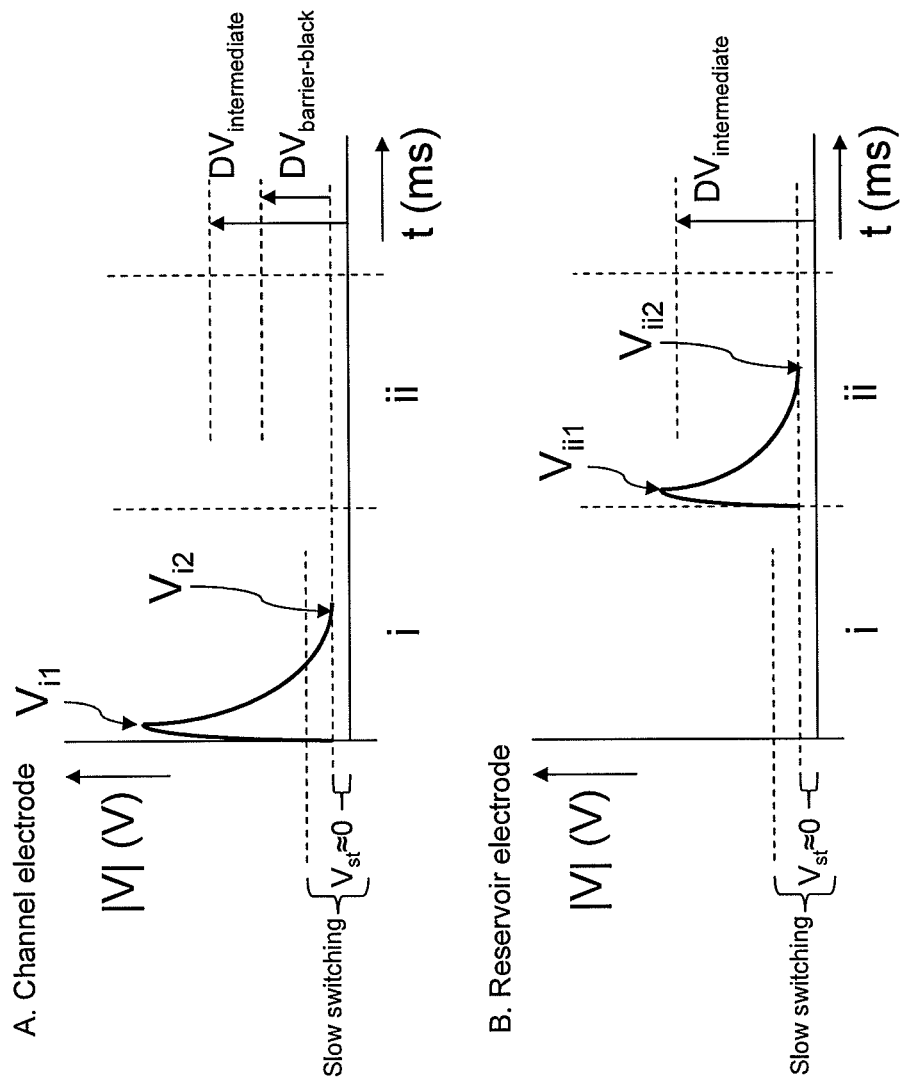
FIG. 16: is a graph depicting properties of a bi-stable configuration—voltage pulse addressing.

FIG. 16: Bi-stable Configuration—Voltage Pulse Addressing

FIG. 16A shows the absolute value of the channel electrode voltage as a function of time and FIG. 16B shows the absolute value of the reservoir electrode voltage as a function of time. Periods denoted by 'i' and 'ii' can be separate frames times but can also be part of one frame time. The labels 'Vst', 'slow switching', 'DVbarrier-black' and 'DVintermediate' have the same meaning as in previous figures.

In period i a voltage pulse with amplitude $Vi1$ is applied to the channel electrode during the line selection time. During the rest of period i the switched voltage decreases to $Vi2$ due to the to-black transition of the pixel. If the period is long enough the water front will stabilize at a new position and $Vi2$ is substantially equal to a voltage of the stable region. The stable region can also have a locally increased stable voltage level due to a to-black barrier.

In period ii a voltage pulse with amplitude $Vii1$ is applied to the reservoir electrode during the line selection time. During the rest of period ii the switched voltage decreases to $Vii2$ due to the to-white transition of the pixel that increases the capacitance of the reservoir. If the period is long enough the water front will stabilize at a new position and $Vii2$ is substantially equal to a voltage of the stable region.

A way to control the grey level of the pixel is now:

1: Retrieve the current switching state of the pixel from memory, Li;

2: Retrieve the next switching state of the pixel, Lii;

3: If Lii is a lighter switching state go to the to-white transition at step 8;

4: Retrieve the channel capacitance Cch(Li) and Cch(Lii) from a lookup table or a formula based on a graph like FIG. 5;

5: Retrieve the voltage, $Vi2$, at Lii at which the fluid front stops moving into the channel;

6: Apply a voltage to the channel electrode of the pixel during a line selection time that is proportional to Cch(Lii) and $Vi2$ and is inversely proportional to Ch(Li), i.e. $Vi1=Cch(Lii)/Cch(Li) \times Vi2$;

7: Go to step 11;

8: Retrieve the reservoir capacitance Cre(Li) and Cre(Lii) from a lookup table or a formula based on a graph like FIG. 4 for the reservoir capacitance as a function of the reflectance or transmission of the pixel;

9: Retrieve the voltage, $Vi2$, at Lii at which the fluid front stops moving into the reservoir;

10: Apply a voltage to the reservoir electrode of the pixel during a line selection time that is proportional Cre(Lii) and $Vi2$ and is inversely proportional to Cre(Li), i.e. $Vi1=Cre(Lii)/Cre(Li) \times Vi2$;

11: Apply a minimum waiting time where the switching circuit is deactivated that is long enough to allow the fluid front to change to the position that corresponds to switching state Lii. During this time other rows of pixels can be addressed.

A prerequisite is that the line selection time is much shorter than the switching time of the pixel; otherwise the formulas in steps 6 and 10 may need a compensation term for switching during the line selection time. Typically this compensation is not needed as a line selection time for a VGA display with 50 frames per second is about 40 microseconds, while the switching time of the polar fluid is in the order of milliseconds.

When a non-zero voltage is applied to the reservoir electrode during a to-black transition the voltage $Vi1$ in step 6 must be increased, as the reservoir electrode voltage induces an additional force that pulls the water back into the reservoir. Effectively this shifts all voltages in FIG. 16A to a higher level proportional to the voltage applied to the reservoir electrode. Similarly when a non-zero voltage is applied to the channel electrode during a to-white transition the voltage $Vi1$ in step 10 must be increased, as the channel electrode voltage induces an additional force that pulls the water back into the channel. Effectively this shifts all voltages in FIG. 16B to a higher level proportional to the voltage applied to the channel electrode. This voltage shift is called the counter voltage, Vcounter, in both cases.

Multiple voltage pulse and cut-off addressing, as shown in FIGS. 8 and 9, respectively can also be applied to the channel electrode as well as the reservoir electrode.

Figure 17:
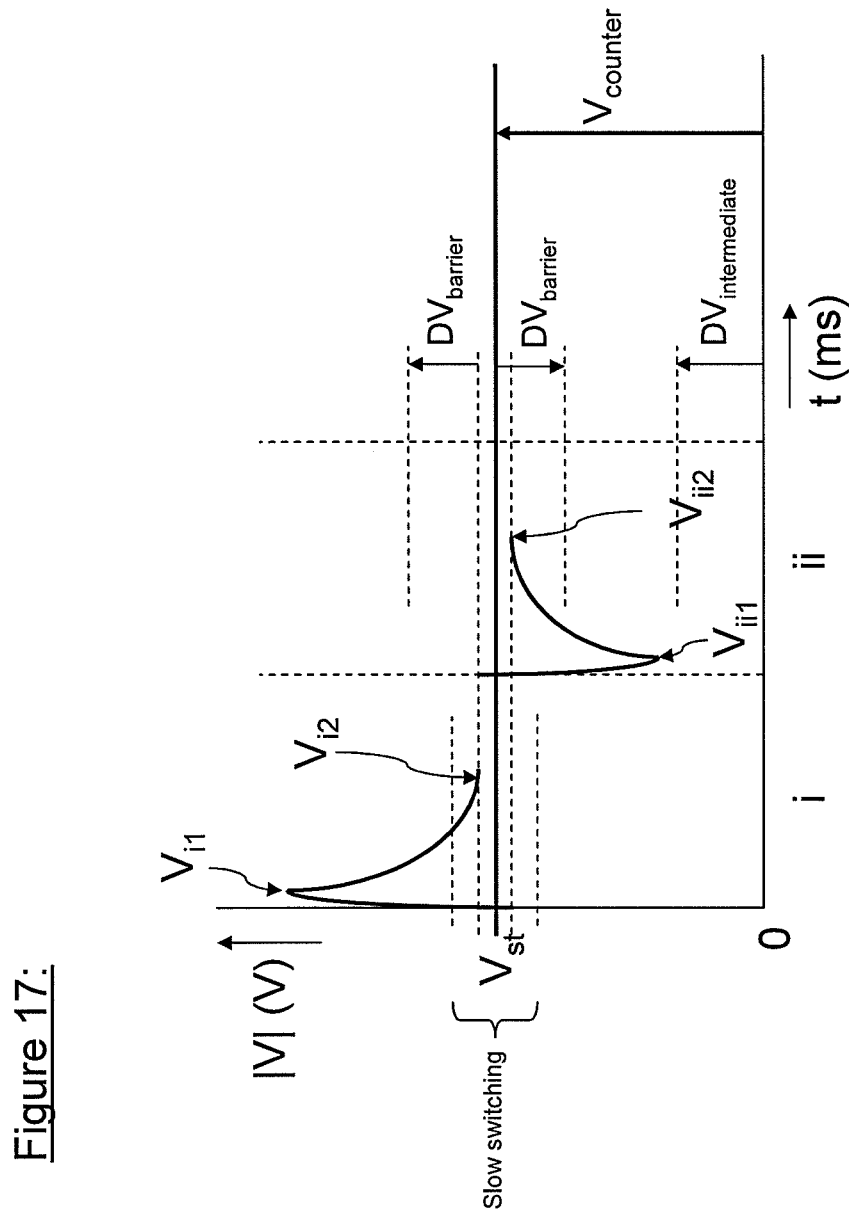
FIG. 17: is a graph depicting properties of a bi-stable configuration.

FIG. 17 Bi-stable Configuration—Combined Channel and Reservoir Addressing

FIG. 17 shows an addressing scheme where the channel and reservoir electrodes are both addressed at the same time. By applying a voltage on one of the two electrodes the voltage on the other electrode can be used to switch the pixel to black as well as to white. For example, a voltage on the reservoir electrode creates an electromechanical force that pulls the water into the reservoir when the channel electrode is at 0V. To overcome this force and switch the pixel to black the channel electrode can be supplied with an increased voltage. This is indicated by the arrow labeled 'Vcounter'. Vcounter is proportional to the applied reservoir electrode voltage and provides a counteracting force. The channel voltage at which the water front is stable is now substantially higher than 0V, as this stable channel voltage is also increased with Vcounter. It is now possible to switch the pixel to white at a channel voltage below the stable channel voltage and to black at a voltage above the stable channel voltage, resulting in an addressing scheme that is very similar to FIG. 7. Accordingly, a single switching circuit is provided for supplying a switched voltage that moves the polar fluid into the channel and out of the channel. The pixel cell comprises at least a direct voltage terminal that is coupled to the reservoir electrode to supply a direct voltage to the reservoir electrode. In addition to the direct voltage applied to provide a counteracting force, an additional direct voltage may be applied by another direct voltage terminal to provide an intermediate condition. In the above the role of the channel and the reservoir electrodes can be interchanged.

The advantage of this addressing scheme is that it is possible to switch the pixel either to black or to white at the same time and not sequentially in time and with a possible simple switching circuit, for example a one TFT circuit, while it is still bi-stable when the voltages on the electrodes are 0V. A possible switching circuit contains a direct voltage electrode connected to either the channel or the reservoir electrode, while the other electrode is connected to the addressing circuit. The addressing circuit may contain an addressing TFT, like shown in FIG. 6 or a charge pump like shown in FIG. 11. The direct voltage electrode may have one common connection to the driver for all pixels in the display or preferably one connection to the driver per row of pixels as that enables row-at-a-time addressing of the pixels. It is also possible that further electrodes are provided to provide an intermediate voltage to either the channel or the reservoir electrode or to both.

When the reservoir electrode is connected to the direct voltage electrode a way to control the grey level of the pixel is now:

1: Retrieve the current switching state of the pixel from memory, Li;

2: Retrieve the next switching state of the pixel, Lii;

3: Retrieve the channel capacitance Cch(Li) and Cch(Lii) from a lookup table or a formula based on a graph like FIG. 5;

4: Retrieve the voltage, Vi2, at Lii at which the fluid front stops moving into the channel; this voltage is substantially equal to Vcounter;

5: Apply a direct voltage Vreservoir to the reservoir electrode. At the same time apply a voltage to the channel electrode of the pixel during a line selection time that is proportional to: Vi1=Cch(Lii)/Cch(Li)×Vi2;

6: Apply a minimum waiting time where the switching circuit is deactivated and where the direct voltage on the reservoir electrode is substantially constant that is long enough to allow the fluid front to change to the position that corresponds to switching state Lii at a channel voltage Vi2. During this time other rows of pixels can be addressed. Next, both the channel and the reservoir voltage may be set to 0V while maintaining the new switching state.

Without limitation, polar fluids may include ionized water preferably containing pigments; without limitation, non-polar fluids may include oil, preferably white or translucent oil. In an alternate embodiment the water contains white pigment and the oil a black dye. Without limitation, the channel surface having a wetting property responsive to an applied electromagnetic field comprises a fluoropolymer.

In the context of this description, the term continuously charged refers to charging of the pixel cell that is irrespective of its load state during a predetermined charging time. While certain embodiments detail certain optional features as further aspects of the invention, the description is meant to encompass and specifically disclose all combinations of these features unless specifically indicated otherwise or physically impossible or irrelevant.

Furthermore, the driver may be configured to provide a cell display property change by multi-phased charging of the further electrode independent of the phases defining pluralities of intermediate conditions, for example, by switching a charge pump irrespective of an intermediate condition. Furthermore, the switching circuit may be provided by circuit elements each addressing a certain phase in the display property change. The circuit elements may for example comprise a 'to black' circuit; a 'to white' circuit and/or reset circuits. Furthermore, the switching circuit may comprise a switched charge pump configured to continuously charge one of the pixel cell terminals. Also, the driver may be configured to provide a cell display property change wherein the polar fluid front is stabilized at the position of a polar fluid front movement barrier. The driver may be configured to apply a drive scheme wherein the polarity of the supply voltage over the pixel cell is inverted at regular time intervals, so as to obtain an average supply voltage being essentially zero to prevent directional build-up of charges in the pixel cell.

Unless otherwise indicated or defined, the following reference list defines elements and aspects as disclosed herein:

1: display or display apparatus

2: pixel cell or pixelized electrofluidic cell

3: further electrode directly connected to the further pixel terminal 4 and charged by driver 5

4: further pixel cell terminal that is coupled to a further electrode 3 to supply a direct voltage to the pixel cell 2

5: driver being configured to charge the row and column electrodes 7,8 and activate the switching circuit 9 to address a switched voltage to a pixel cell 2 via switched terminal 10

6: circuit board comprising a plurality of switching circuits 9 for supplying a switched voltage to the pixel cells 2, a driver 5 and row and column electrodes 7, 8.

7: row electrode coupled to the switching circuit 9

8: column electrode coupled to the switching circuit 9

9: switching circuit comprising the active element connected to at least one pixel cell terminal, so as to vary the wetting property of the surface and connected to a row and column electrode.

10: switched terminal of the pixel cell 2 being addressed by and connected to the switching circuit 9.

20: pixel cell

21: fluid holder: including fluid reservoir 22 and channel 23 that are connected 22: fluid reservoir with small visible area connected to the channel 23: channel with large visible area connected to the reservoir 24: polar fluid 25: large principle radius of curvature of the polar fluid 24 in the fluid reservoir 22

26: small principle radius of curvature of the polar fluid 24 in the channel 23

27: surface of the channel 23

Pixel: the combination of a switched circuit and a connected pixel cell of the display apparatus 1.

Pixel color: cell display property, also encompassing monochromatic variants

Supply voltage: the voltage difference applied to the at least 2 pixel cell terminals.

Basic supply voltage: the supply voltage difference applied over a channel surface part generating a minimum electromechanical force in the pixel cell in the intermediate condition.

Switched voltage: the voltage applied to the pixel cell 2 via the switched terminal 10 by the switching circuit 9.

Direct voltage: the voltage supplied to the further electrode 3 that is coupled to the at least one further pixel cell terminal 4 of the pixel cell 2

Pixel cell terminals: at least two terminals arranged to supply a supply voltage over at least part of the surface of the channel 23 comprising the wetting property responsive to the applied supply voltage Cell display property: a certain transmissive or reflective optical state of the pixel cell 20

Transition error: the mismatch between the desired cell display property, e.g. color or grey tone, and the achieved cell display property at the end of a transition between the two cell display properties Intermediate condition: the state of the pixel cell wherein the possible cell display property changes are limited due to the supply of a basic supply voltage to the at least one further pixel cell terminal with the aim to reduce the switched voltage required to induce a change in the cell display property Multiphase cell display property change or the multiphase pixel color change: the total (cumulative) change of the cell display property from the start of the first phase until the end of the last phase in a multiphase drive scheme.

Frame: a period wherein all pixels in the display have been addressed with a part of the image update. For an LCD this is typically 15-20 ms in length where all pixels of the displays are addressed once, sequentially per row of pixels thereby creating a new image. For an Electrophoretic (E Ink) display this is typically 10-20 ms in length where all pixels are addressed once (i.e. a new or the same voltage is transferred from the column to the pixel), where 25-100 frames are used to create a new image from the previous image in the display.

Pulse: a pulse is the voltage that is transferred to the pixel during addressing, where addressing in done during the line (selection) time. The line time is the time wherein the row of pixels is addressed. It is typically as long as the frame time divided by the number of rows in the display when only one single line selection time per row per frame is used. In general when more than one line selection time per row per frame is used (FIG. 9) it is as long as the frame time divided by the number of rows divided by the number of pulses.

Period: a period is a time unit wherein the switching state of a pixel is changed due to the supply of a pulse to the pixel. This can be as long as one complete frame time or it can be a small part of one frame time when multiple line selection times per frame are used.

Switching speed: the switching speed is the speed at which the water front moves in the channel. This is a function of the applied voltage over the channel surfaces of the pixel and also a function of for example the drag force. The drag force is the force that is created by water moving over the channel surface and increases as a function of the switching state of the pixel. Switching speed is sometimes measured in ms to go from white to black or from a certain grey level to another grey level. In EFC systems the white to black switching speed (and vice versa) can be as low as 1 ms, although it is also possible to increase the viscosity and go to a speed in the 10-100 ms range.

The detailed drawings, specific examples and particular formulations given serve the purpose of illustration only. Other substitutions, modifications, changes, and omissions may be made in the design, operating conditions, and arrangement of the exemplary embodiments without departing from the scope of the invention as expressed in the appended claims.

What is claimed is:

1. A display apparatus, the apparatus comprising:
    a plurality of electrofluidic chromatophore (EFC) pixel cells, each pixel cell comprising:
        a fluid holder for holding a polar fluid and a non-polar fluid having differing display properties, the fluid holder comprising:
        (a) a fluid reservoir with a geometry having a small visible area projected in the direction of the viewer, and
        (b) a channel with a geometry having a large visible area projected in the direction of the viewer, the channel being connected to the reservoir so as to enable movement of the polar fluid and non-polar fluid between the channel and the reservoir, at least part of a surface of the channel comprising a wetting property responsive to a supply voltage,
        at least two pixel cell terminals being arranged to provide the supply voltage to the at least part of the surface of the channel comprising the wetting property; the supply voltage resulting in a movement of the polar fluid to change a cell display property or in the absence of movement of the polar fluid being a stable voltage;
    a circuit board, the circuit board comprising:
        a switching circuit for supplying an electrical charge to the pixel cells, the switching circuit being connected to one of the at least two pixel cell terminals, so as to generate the supply voltage,
        a row and column electrode coupled to the switching circuit; and
        a driver configured to charge the row and column electrodes and activate the switching circuits; and
    a display controller arranged to control the driver as a result of pixel image information inputted in the display controller; the display controller comprising a state lookup table storing, for a respective pixel cell, the current pixel cell display property, the display controller further arranged to calculate the electrical charge as a function of the current pixel cell display property and the a new pixel cell display property;
        and wherein controller controls the driver to supply the calculated electrical charge to the pixel cell,
    wherein:
        the driver is arranged to supply the calculated electrical charge to the pixel cell by providing a switched voltage, the switched voltage resulting in a supply voltage different from the stable voltage; and
        the switched voltage is provided based on a ratio of a first calculated pixel capacitance to a second calculated pixel capacitance, the first calculated pixel capacitance corresponding to the new pixel cell display property and the second calculated pixel capacitance corresponding to the current pixel cell display property.

2. The display apparatus according to claim 1, wherein the switched voltage is proportional to the first calculated pixel capacitance and inversely proportional to the second calculated pixel capacitance.

3. The display apparatus according to claim 1, wherein the cell display property is expressed as a transmission and/or reflection of the pixel cell for a predefined wavelength.

4. The display apparatus according to claim 1, wherein the controller controls the driver to provide the switched voltage in the form of at least a single voltage pulse during a row selection time.

5. The display apparatus according to claim 1, wherein the controller controls the driver to provide the switched voltage in the form of a plurality of switched voltage pulses to drive the pixel cell to the new pixel cell display property; at least in a transition where the polar fluid moves into the channel.

6. The display apparatus according to claim 5, wherein the plurality of switched voltage pulses are provided in multiple row addressing periods.

7. The display apparatus according to claim 5, wherein the plurality of pulses vary in switched voltage amplitude.

8. The display apparatus according to claim 7, wherein the switched voltage increases, in said transition where the polar fluid moves into the channel; for a subsequently provided voltage pulse.

9. The display apparatus according to claim 5, wherein, for a last one in the plurality of pulses; the switched voltage corresponds to the stable voltage.

10. The display apparatus according to claim 1, wherein the switching circuit comprises a switched charge pump configured to supply the electrical charge.

11. The display apparatus according to claim 1, wherein:
    the pixel cell comprises at least one direct voltage terminal that is coupled to a further electrode to supply a direct voltage to the pixel cell, and
    the driver is further configured to additionally charge the further electrode, to define a pixel cell intermediate condition.

12. The display apparatus according to claim 11, wherein the driver is configured to supply a direct voltage to the pixel cell that is dependent on the cell display property change.

13. The display apparatus according to claim 11, wherein the polar fluid is conductive, wherein a switched terminal is coupled to a contact electrode contacting the conductive polar fluid and the direct voltage terminal is coupled to a second channel electrode, and, the switched terminal is one of the at least two pixel cell terminals.

14. The display apparatus according to claim 11, wherein the polar fluid is conductive and wherein a switched terminal is coupled to a second channel electrode and the direct voltage terminal is coupled to a contact electrode contacting the conductive polar fluid, and, the switched terminal is one of the at least two pixel cell terminals.

15. The display apparatus according to claim 1, wherein the surface channel wetting property is arranged to stabilize the polar fluid front in an absence of a supply voltage; and wherein a reservoir electrode is arranged to move the polar fluid out of the channel.

16. The display apparatus according to claim 15, wherein a single switching circuit is provided for supplying a switched voltage that moves the polar fluid into the channel and out of the channel and wherein the pixel cell comprises at least a direct voltage terminal that is coupled to the reservoir electrode to supply a direct voltage to the reservoir electrode.

\* \* \* \* \*